United States Patent [19]
Matsuda et al.

[11] Patent Number: 6,106,906
[45] Date of Patent: Aug. 22, 2000

[54] MATERIAL FOR FORMING ELECTROCONDUCTIVE FILM, METHOD OF FORMING ELECTROCONDUCTIVE FILM BY USING THE SAME AND METHOD OF MANUFACTURING ELECTRON-EMITTING DEVICE, ELECTRON SOURCE AND IMAGE-FORMING APPARATUS

[75] Inventors: Hiroshi Matsuda, Isehara; Ryoji Fujiwara, Chigasaki, both of Japan

[73] Assignee: Canon Kabushiki Kaisha, Tokyo, Japan

[21] Appl. No.: 08/508,538

[22] Filed: Jul. 28, 1995

[30] Foreign Application Priority Data

| Aug. 1, 1994 | [JP] | Japan | 6-197134 |
| Aug. 1, 1994 | [JP] | Japan | 6-197135 |
| Aug. 11, 1994 | [JP] | Japan | 6-209382 |
| Jul. 25, 1995 | [JP] | Japan | 7-208484 |

[51] Int. Cl.$^7$ .................. B05D 3/06; B05D 5/12
[52] U.S. Cl. .................. 427/558; 427/126.1; 427/385.5; 428/1; 556/136; 556/138
[58] Field of Search .............. 427/126.1–6, 385.5, 427/558; 428/457, 1; 556/136, 138

[56] References Cited

U.S. PATENT DOCUMENTS

| 4,339,311 | 7/1982 | Branik | 204/47 |
| 4,835,083 | 5/1989 | Sakai et al. | 430/296 X |
| 5,149,854 | 9/1992 | Nappier | 556/136 X |
| 5,225,273 | 7/1993 | Mikoshiba et al. | 428/323 |
| 5,331,056 | 7/1994 | Picate et al. | 525/279 |
| 5,403,649 | 4/1995 | Morgan et al. | 428/457 X |
| 5,449,534 | 9/1995 | Oishi et al. | 427/126.3 X |
| 5,677,014 | 10/1997 | Ohnishi et al. | 427/596 X |

FOREIGN PATENT DOCUMENTS

| E0391314 | 10/1990 | European Pat. Off. . |
| 2939920A1 | 4/1981 | Germany . |
| 63-192874 | 8/1988 | Japan . |

OTHER PUBLICATIONS

M. Hartwell, et al., "Strong Electron Emission From Patterned Tin–Indium Oxide Thin Films," Int. Electron Devices Meeting, 1975, pp. 519–521.

M. Elinson, et al., "The Emission of Hot Electrons and The Field Emission of Electrons from Tin Oxide," Radio Engineering and Electronic Physics, 1965, pp. 1290–1296.

H. Araki, et al., "Electroforming and Electron Emission of Carbon Thin Films," J. Vac. Soc. Japan, vol. 26, 1983, pp. 22–29.

G. Dittmer, "Electrical Conduction and Electron Emission of Discontinuous Thin Films," Thin Solid Films, 9 (1972) pp. 317–328.

C.A. Spindt, et al., "Physical Properties of Thin–Film Field Emission Cathodes with Molydenum Cones," J. Appl. Phys., vol. 47, (1976), pp. 5248–5263.

C.A. Mead, "Operation of Tunnel–Emission Devices," J. Appl. Phys., 32, pp. 646–652.

Dyke and Dolan, "Field Emission," Advances in Electronics and Electron Physics, vol. VIII, (1956), pp. 90–185.

Primary Examiner—Michael Lusignan
Attorney, Agent, or Firm—Fitzpatrick, Cella, Harper & Scinto

[57] ABSTRACT

A material for forming an electroconductive film on a substrate comprises a metal and hydrophobic and hydrophilic components. Preferably, the material comprises an organometallic complex expressed by general formula $(R^1COO)_nM(NR^2R^3R^4)_m$ wherein $R^1$ represents an alkyl group, each of $R^2$, $R^3$ and $R^4$ represents a hydrogen atom, an alkyl group or an alkenyl group, M represents a metal element and each of n and m represents an integer equal to or greater than 1. The material can be used for forming an electroconductive film of an electron-emitting device or forming a liquid crystal alignment film.

70 Claims, 17 Drawing Sheets

MATERIAL FOR FORMING ELECTROCONDUCTIVE FILM, METHOD OF FORMING ELECTROCONDUCTIVE FILM BY USING THE SAME AND METHOD OF MANUFACTURING ELECTRON-EMITTING DEVICE, ELECTRON SOURCE AND IMAGE-FORMING APPARATUS

BACKGROUND OF THE INVENTION

1. Field of the Invention

This invention relates to a novel material that can be used for forming an electroconductive film and a method of forming an electroconductive film by using such a novel material as well as a method of manufacturing an electron-emitting device, an electron source and an image-forming apparatus.

A novel material according to the invention that can be used for forming an electroconductive film can also be used for forming a liquid crystal alignment film.

2. Related Background Art

Conventional electroconductive films that can be used for electric wiring and electrodes have a film thickness from several hundred to several thousand nanometers and are typically formed by means of a method involving the use of a vacuum apparatus such as vapor deposition or sputtering.

An electroconductive film formed by means of such a method can be used for the above identified applications as long as its electroconductivity is linearly proportional to its film thickness. If the electroconductivity is no longer linearly proportional to the film thickness, it is likely to change abruptly and go out of control. Additionally, with the above described method, the prepared film would be rather unstable in the initial stages of manufacturing in terms of chemical, physical and electric properties including electroconductivity. Thus, it has been extremely difficult with the above described conventional film forming method to control the electric properties of an electroconductive thin film particularly when the film thickness is less than several hundred nanometers and more particularly when the thickness is less than tens of several nanometers. The applications of such a thin electroconductive film include the electron-emitting region of surface conduction electron-emitting devices and the liquid crystal alignment film of liquid crystal type image-forming apparatuses. To begin with, an electron-emitting device will be described below.

There have been known two types of electron-emitting device; the thermionic cathode type and the cold cathode type. Of these, the cold cathode emission type refers to devices including field emission type (hereinafter referred to as the FE type) devices, metal/insulation layer/metal type (hereinafter referred to as the MIM type) electron-emitting devices and surface conduction electron-emitting devices. Examples of FE type device include those proposed by W. P. Dyke & W. W. Dolan, "Field emission", Advance in Electron Physics, 8, 89 (1956) and C. A. Spindt, "PHYSICAL Properties of thin-film field emission cathodes with molybdenium cones", J. Appl. Phys., 47, 5248 (1976).

Examples of MIM device are disclosed in papers including C. A. Mead, "Operation of Tunnel-Emission Devices", J. Appl. Phys., 32, 646 (1961).

Examples of surface conduction electron-emitting device include one proposed by M. I. Elinson, Radio Eng. Electron Phys., 10, 1290 (1965).

A surface conduction electron-emitting device is realized by utilizing the phenomenon that electrons are emitted out of a small thin film formed on a substrate when an electric current is forced to flow in parallel with the film surface. While Elinson proposes the use of $SnO_2$ thin film for a device of this type, the use of Au thin film is proposed in [G. Dittmer: "Thin Solid Films", 9, 317 (1972)] whereas the use of $In_2O_3/SnO_2$ and that of carbon thin film are discussed respectively in [M. Hartwell and C. G. Fonstad: "IEEE Trans. ED Conf.", 519 (1975)] and [H. Araki et al.: "Vacuum", Vol. 26, No. 1, p. 22 (1983)].

FIG. 20 of the accompanying drawings schematically illustrates a typical surface conduction electron-emitting device proposed by M. Hartwell. In FIG. 20, reference numeral 1 denotes a substrate. Reference numeral 3 denotes an electroconductive thin film normally prepared by producing an H-shaped thin metal oxide film by means of sputtering, part of which eventually makes an electron-emitting region 2 when it is subjected to an electrically energizing process referred to as "energization forming" as described hereinafter. In FIG. 20, the thin horizontal area of the metal oxide film separating a pair of device electrodes has a length $L_1$ of 0.5 to 1[mm] and a width $W_1$ of 0.1[mm].

Conventionally, an electron emitting region 2 is produced in a surface conduction electron-emitting device by subjecting the electroconductive thin film 3 of the device to an electrically energizing preliminary process, which is referred to as "energization forming". In the energization forming process, a constant DC voltage or a slowly rising DC voltage that rises typically at a rate of 1V/min is applied to given opposite ends of the electroconductive thin film 3 to partly destroy, deform or transform the film and produce an electron-emitting region 2 which is electrically highly resistive. Thus, the electron-emitting region 2 is part of the electroconductive thin film 3 that typically contains a gap or gaps therein so that electrons may be emitted from the gap. A surface conduction electron-emitting device that has been subjected to an energization forming process emits electrons from its electron-emitting region 2 when a voltage is applied to the electroconductive thin film 3 to make an electric current run through the device.

Now, a display apparatus comprising liquid crystal will be described. For example, to realize a display apparatus comprising liquid crystal in the twisted nematic mode (usually referred to as TN mode), an alignment film is formed on a pair of electrodes arranged on each of opposed surfaces of substrates and then subjected to a rubbing process where the film is rubbed along a direction perpendicular to that of alignment and liquid crystal is filled into the space between the films, the electrodes and the substrates. With such a process, the molecules of the liquid crystal is aligned to become electrically active so that the transmissivity of incident light that has passed through a polarizers is remarkably changed by the liquid crystal so that images are formed on the display apparatus.

Of electron-emitting devices of various types, surface conduction electron-emitting devices are particularly used for image-forming apparatuses having a large display screen because they are structurally simple and can be manufactured in a simple way. As a result of intensive research efforts, the inventors of the present invention have discovered that the energization forming process is particularly important in the manufacture of surface conduction electron-emitting devices having electrically excellent properties and that the use of thin film having a film thickness less than several hundred nanometers, preferably less than 20 nanometers, is particularly suitable for surface conduction electron-emitting devices. Thus, the inventors of the present invention have been engaged in inventing an improved method of preparing electroconductive thin film having a film thickness under the above defined limit. Specifically, electroconductive thin film made of a metal and/or the oxide thereof can be produced by applying a solution containing an organometallic complex to a substrate by means of a spinner and baking the substrate at high temperature in the atmosphere. While this technique of using a spinner is advantageous in that it can be produce a large electroconductive thin film because it does not involve the use of a vacuum apparatus as in the case of vapor deposition, it is accompanied by a difficulty with which a thin film having a uniformity of thickness is prepared because an organometallic complex is highly aggregative. While the highly aggregative tendency may be reduced by raising the concentration of hydrocarbon at the organic moiety of the organometallic complex, the energy required to attaching hydrocarbon to and detaching it from the organic moiety increases as the hydrocarbon concentration rises. As a result, the molten organomettalic complex can easily aggregate during the baking operation to produce electroconductive thin film having an uneven film thickness. On the other hand, an organometallic complex with a low hydrocarbon concentration at the organic part is likely to show an uneven distribution on a substrate to which it is applied and can partly be sublimated during the baking process to produce a thin film having an uneven film thickness. Particularly, while a very large electroconductive thin film having an uneven and optimal thickness has to be formed for preparing an electron source comprising a plurality of surface conduction electron-emitting devices arranged over a large area, the electron-emitting devices can perform unevenly in the operation of emitting electrons if the electroconductive thin film has an uneven distribution of film thickness and hence of electric properties.

Meanwhile, films of dielectric substances such as polyimide films having a film thickness less than tens of several nanometers, preferably less than 15 nanometers, are widely used as alignment films for image-forming apparatuses comprising liquid crystal. Such an arrangement is, however, accompanied by the problem of uneven film thickness, which by turn gives rise to an accumulated large electric charge on the part of the liquid crystal alignment film, hysteresis, afterimages and other transmittance-related troubles to reduce the image quality of the apparatus.

These problems will be dissolved if the electric resistivity of the polyimide film can be controlled to make it electroconductive to a certain extent. While a number of techniques may be conceivable for controlling the resistivity of the polyimide film, the most handy one will be controlling the impedance of the polyimide film by dispersing a metal and/or the oxide thereof into the film.

Polyimide can typically be obtained by chemically or thermally dehydrating and cyclizing (imidizing) polyamic acid that is a precursor of polyimide. Thus, a conceivable easy way of producing a polyimide film containing a metal and/or the oxide thereof in the form of dispersed fine particles may be to mix polyamic acid and a metal or an organic compound of the metal, form a film of the mixture on a substrate and then imidize the film. However, such a way is not practically feasible because the carboxylic group of the polyamic acid and the metal can easily react with each other for cross-linking to make gel and it is practically impossible to form a film of a polymer that has gelled.

An imide film containing a metal and/or the oxide thereof may alternatively be formed by preparing a mixture of soluble imide and the metal or an organic compound of the metal and laying the mixture on a substrate by appropriate means to form a multilayer structure. Then, gellation of the mixture can be avoided unless a group such as a carboxyl group is intentionally introduced into soluble polyimide to make the latter actively form a complex with metal. However, the structural types of polyimide that are compatible with this technique are narrowly limited to a small number.

A metal compound that would not allow two or more than two additional ligands to be coordinated may be used for a still alternative method of avoiding gellation of the mixture of polyamic acid and the metal or an organic compound of the metal. However, it is difficult to prepare and use a metal compound that has only one moiety for coordination when such additional ligands are prohibited from coordination. If no moiety is available for coordination in a metal compound, such a compound can hardly be mixed with polyamic acid to produce a desired mixture and the ingredients of the obtained mixture may more often than not be separated into different phases. Thus, it is very difficult to form a polyimide film containing a metal and/or the oxide thereof in an evenly dispersed state.

SUMMARY OF THE INVENTION

In view of the above identified problems, it is an object of the present invention to provide an electron-emitting device capable of evenly emitting electrons and an electron source comprising electron-emitting devices that can evenly emit electrons as well as an image-forming apparatus comprising such an electron source.

Another object of the invention is to provide a material that can be used for forming an electroconductive film capable efficiently emitting electrons even it has a film thickness less than hundreds of several nanometers, preferably less than 20 nanometers and a method of forming electroconductive by using such a material.

Still another object of the invention is to provide a high quality image-forming apparatus that is free from the problem of uneven brightness of the displayed image and hysteresis. A further object of the invention is to provide a material that can be used for forming a liquid crystal alignment film having an even film thickness and showing desired electric properties including electroconductivity even the film thickness is less than tens of several nanometers and a method of manufacturing such a liquid crystal alignment film.

According to an aspect of the present invention, there is provided a material for forming an electroconductive film, wherein said material comprises a metal and hydrophobic and hydrophilic components.

According to another aspect of the present invention, there is provided a method of forming an electroconductive film, wherein said method comprises a step of applying the above identified material to a substrate and heating it.

According to still another aspect of the present invention, there is provided a method of forming an electroconductive film, wherein said method comprises a step of forming a monomolecular film on a substrate and heating it.

According to further aspect of the present invention, there is provided a method of manufacturing an electron-emitting device comprising an electroconductive film formed by the above identified method, an electron source comprising such electron-emitting devices and an image-forming apparatus comprising such an electron source as well as a method of manufacturing a liquid crystal alignment film and a liquid crystal display apparatus.

DETAILED DESCRIPTION OF THE PREFERRED EMBODIMENTS

Figure 1:
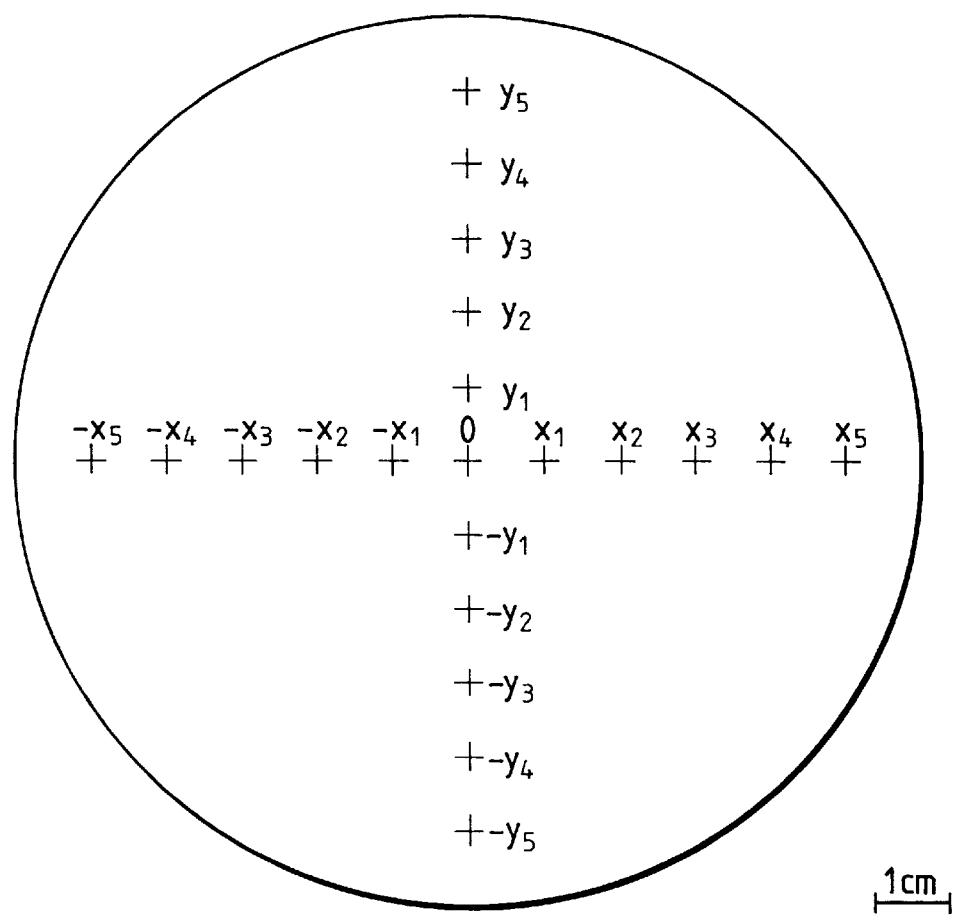
FIG. 1 is a schematic view of a glass substrate, which is used in Example 26.

Now, the present invention will be described by referring to the accompanying drawings that illustrate preferred embodiment of the invention.

A material for forming an electroconductive thin film according to the invention comprises a metal for imparting electroconductivity to the material and hydrophobic and hydrophilic components for improving the uniformity and the thickness controllability of the film during a baking operation.

Metals that can be used for electroconductivity include Pd, Ru, Ag, Cu, Cr, Tb, Cd, Fe, Pb and Zn and any of these metals may be introduced into the material by dispersion or as ions and can be used as a concentration between 0.1 to 2 weight %.

The hydrophobic component may be an alkyl or alkenyl group having a large number of carbon atoms. On the other hand, if the number of carbon atoms of the hydrophobic component is too large, a film of the material will be only poorly formed in the process of producing an electroconductive "film" including an electron-emitting region, which will be described hereinafter. Thus, the hydrophobic component may preferably be an alkyl or alkenyl group having 18 to 30 carbon atoms to meet the above requirements.

The hydrophilic component may be carboxylic acid, a metal carboxylate, alcohol or an amino group. The use of a metal carboxylate is preferable because it comprises both a metal and a hydrophilic component in the molecule.

A material for forming an electroconductive thin film according to the invention may be prepared by mixing a compound having a hydrophobic component and another compound having a hydrophilic component. Alternatively and preferably, a material according to the invention may be prepared from a compound having both hydrophobic and hydrophilic components or by mixing two or more than two compounds each having both hydrophobic and hydrophilic components. Examples of materials that can be used for the purpose of the invention include, metal carboxylates having a long chain (e.g., palladium palmitate, terbium pentadecanate, iron oleate), alkyl and alkenyl amines having a long chain (e.g., didecylamine, methyloctadecylamine).

A material for forming an electroconductive thin film according to the invention is prepared by mixing any of the above compounds at an appropriate ratio and, if necessary, dissolved into an organic solvent before it is applied to a substrate by appropriate means (e.g., rotary application, dipping, the Langmuir-Blodgett's technique (hereinafter referred to as LB technique)).

Now, the present invention will be described in greater detail by referring to a method of forming a palladium or palladium oxide film as a preferable electroconductive thin film. Such a method comprises steps of depositing an organic mixture containing at least an organic palladium complex on a substrate, irradiating the deposited film of the organic mixture with ultraviolet rays and heating and baking the film.

Appropriate known techniques for depositing a thin film including rotary application, dipping and the LB technique may be used to deposit an organic mixture on a substrate for the purpose of the invention. Of these, the techniques of rotary application and dipping are simple but the LB technique is preferable because it can produce films with a uniformity of thickness in a relatively simple manner.

Now, the use of the LB technique for forming a film of an organic mixture by deposition will be described.

An organic palladium complex that can suitably be used with the LB technique for the purpose of the invention is an alkylamine complex of acid-palladium salt containing two chemical equivalents of alkylamine and two chemical equivalents of fatty acid (which may be acetic acid) to a chemical equivalent of palladium and expressed by general formula (1) below.

$$Pd^{2+}[R^1COO^-]_2[R^2R^3R^4N]_2 \qquad (1)$$

where each of $R^1$, $R^2$, $R^3$ and $R^4$ represents a hydrocarbon having 1 to 30 carbon atoms and one or two of $R^2$, $R^3$ and $R^4$ may be hydrogen. In short, the alkylamine may be primary, secondary or tertiary amine. Part or all of the hydrogen atoms of the chained hydrocarbon may be replaced by fluorine atoms. Note, however, that the number of carbon atoms contained in each of $R^2$, $R^3$ and $R^4$ is preferably equal to or greater than 5 in order for it to be hydrophobic. Additionally, at least one of $R^2$, $R^3$ and $R^4$ preferably has 18 or more carbon atoms and the total number of their carbon atoms is not smaller than 18.

When an LB film (a film formed by means of the LB technique) is formed by using only an alkylamine complex of acid-palladium salt expressed by formula (1), at least one of $R^1$, $R^2$, $R^3$ and $R^4$ preferably has 18 or more carbon atoms. Such a complex may be expressed by formula (2) below.

$$Pd^{2+}[CH_3COO^-]_2[(C_{18}H_{37})_2NCH_3]_2 \qquad (2)$$

Alternatively, an organic palladium complex having an appropriate structure may be mixed with an amphiphilic material (hereinafter referred to a binder) suitable for forming a film by means of the LB technique for the purpose of the invention. Compounds that can be used as binder include saturated or unsaturated fatty acids having 18 to 30 carbon atoms and examples of such fatty acids include octadecylic acid, eicosanic acid, docosanoic acid and other straight chain fatty acids. Polymeric substances such as poly(isobutyl methacrylate), poly(methyl methacrylate) and poly(butylic acid) may also be used.

For the purpose of the invention, the use of a binder can significantly broaden the choice of organic palladium complexes because such a binder is highly capable of forming an LB film. In other words, the palladium complex to be used for the purpose of the invention does not necessarily have the ability of forming a stable LB film by itself. For example, when an alkylamine complex of acid-palladium salt expressed by formula (1) is used with such a binder, it may specifically be an alkylamine complex of formula (3), where the total number of carbon atoms contained in $R^1$, $R^2$, $R^3$ and $R^4$ is relatively small.

$$Pd^{2+}[CH_3COO^-]_2[(C_{10}H_{21})_2NH]_2 \qquad (3)$$

While there is no restriction for the mixing ratio of the organic palladium complex and the binder, the mol ratio (in terms of monomer if the binder is a polymer) of the organic palladium complex relative to the binder is typically between 1 to 0.01 and 1 to 100. As the proportion of the binder increases, the formation of an LB film of the mixture becomes easier but the density of palladium falls. In other words, the overall film thickness has to be made greater in order to obtain a palladium or palladium oxide film with a desired thickness when the proportion of the binder is high as compared with the film thickness when the proportion of the binder is low.

Conversely, when the proportion of the binder is low, the LB film forming ability of the binder is reduced. All in all, a preferable ratio of the binder to the organic palladium complex will be between 1 to 0.4 and 1 to 10 in terms of molar concentration, although the above ratio may be neglected and a different mixing ratio may be selected if the organic palladium complex to be used has a sufficiently high LB film forming ability. If such is the case, the density of the organic palladium complex can be controlled as an effect of using a mixture to better control the aggregating effect, the film thickness and the electroconductivity of the final product of palladium or palladium oxide film.

An LB film can be formed out of an organic mixture of the above described type by any appropriate known technique and the existing equipment designed to produce such a film may be used without any significant alterations. When forming a film out of a material of the above described type by means of the LB technique for the purpose of the invention, the lower phase water of the reaction system is not necessarily required to contain palladium ions and pure water may be used for it so that the overall cost of forming such a film can be significantly reduced and no considerations may be required for disposing the wasted lower phase water.

For the purpose of the present invention, a film of an organic mixture containing at least an organic palladium complex is formed on a substrate by deposition preferably to a thickness of 10 to 50 Å and, thereafter, irradiated with ultraviolet rays in order to decompose the complex at organic moieties. The irradiation is preferably conducted in an ozone atmosphere or while introducing oxygen so that the decomposition at organic moieties may be accelerated.

During the above operation of irradiation of ultraviolet rays, the organic mixture film is preferably heated without melting it in order to accelerate the decomposition of the complex at organic moieties. Care should be taken not to overheat the film at an area in the vicinity of the source of ultraviolet rays because the film can easily be heated in that area.

While the time during which the operation of ultraviolet ray irradiation is conducted depends on the intensity of ultraviolet rays, the ozone concentration, the film material and other factors, the complex has to be decomposed by at least 50% at organic moieties in the film. The complex is decomposed preferably by more than 90% and more preferably by more than 99% in order to minimize the possible aggregation of the molten film material in the subsequent heating and baking process.

When the step of ultraviolet ray irradiation is over, the film is subjected to a heating and baking step. This operation is preferably conducted at temperature higher than 250° C. for a period of approximately 10 minutes or more. If the baking operation is conducted in an oxygen containing atmosphere, the palladium in the film is thermally oxidized to produce a palladium oxide film. If, on the other hand, the baking operation is conducted without oxygen, the baked product will be a palladium film.

The above operation of ultraviolet ray irradiation may be extended into the heating and baking step without producing any problem. If the operation of ultraviolet ray irradiation is conducted in an ozone containing atmosphere, the heating and baking step may be omitted to directly obtain palladium oxide, although the duration of the step of ultraviolet ray irradiation will have to be made very long.

With a method of forming an electroconductive thin film according to the invention, a desired palladium or palladium oxide film can be produced within a very short period of time by baking the film after irradiating it with ultraviolet rays.

According to the invention, there is provided a thin electroconductive polyimide film containing a metal and/or a metal oxide. There is also provided a method of forming a thin electroconductive polyimide film containing a metal and/or a metal oxide comprising steps of forming a layer of a mixture of polyamic acid ester and a metal or an organometallic compound on a substrate and subsequently imidizing the polyamic acid ester.

Now, a thin electroconductive polyimide film containing a metal and/or a metal oxide and a method of forming such a film will be described.

For the purpose of the invention, polyamic acid ester is used as a precursor of polyimide. A method of forming an electroconductive thin film comprises steps of forming on a substrate a layer of a mixture of such polyamic acid ester and a metal or an organometallic compound, which may preferably be a complex compound of palladium that can act to a relatively small extent on the ester moiety of polyamic acid ester, and subsequently chemically and/or thermally imidizing the polyamic acid ester.

For the purpose of the invention, polyamic acid ester is typically expressed by formula (4) below.

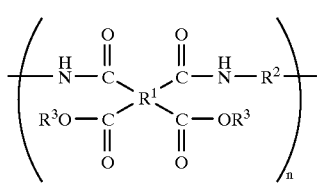
(4)

where $R^3$ represents an aklyl group having one or more than one carbon atoms, which may be replaced by hydrogen atoms so that $R^1$ and $R^2$ may be structurally same as or different from those of any known polyamic acid. Specific examples of $R^1$ and $R^2$ are shown below. Note that a copolymer comprising two or more than two different polyamic acid esters may alternatively be used.

Examples of $R^1$ in formula (4)

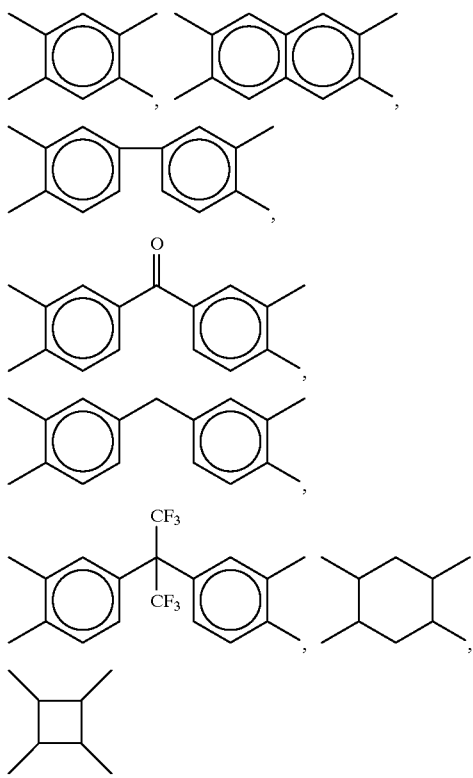

Examples of $R^2$ in formula (4)

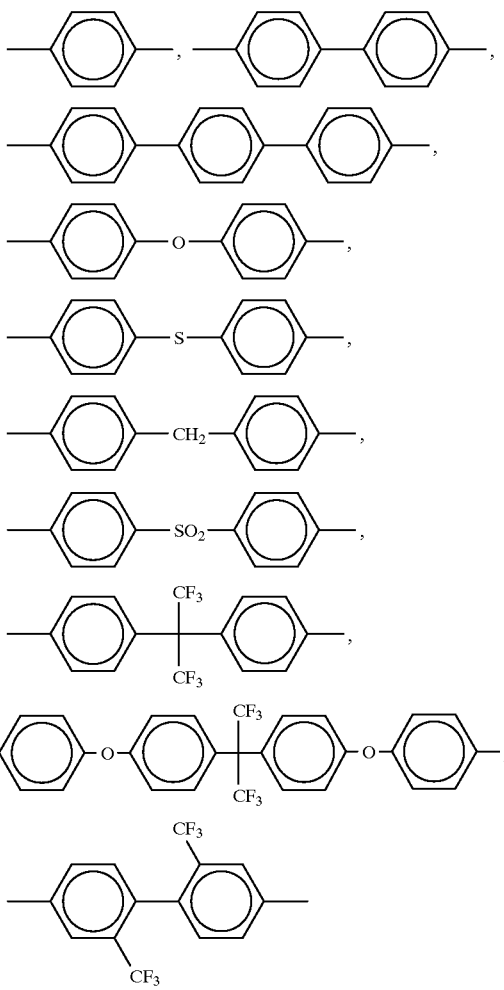

Polyamic acid ester can be synthetically prepared by any known method. For example, it can be prepared by using a corresponding polyamic acid as a starting substance and causing its acidic chloride to react with an alcohol or alcoxyde having a desired alkyl group ($R^3$ in this case).

While there is no particular upper limit for the number of carbon atoms of $R^3$, the use of an extremely large number of carbon atoms is not recommendable because some of the carbon atoms will have to be removed at the time of imidization. The number of carbon atoms is preferably between 1 and 30 and more preferably between 1 and 22. Polyamic acid ester is normally soluble in a polar solvent such as N,N-dimethylacetamide (hereinafter referred to as DMAc), 2-N-methylpyrrolidone (hereinafter referred to as NMP) or γ-butyrolactone or a mixed solvent containing such a polar solvent.

Then, the polyamic acid ester solution dissolved in a solvent is mixed with a metal or an organometallic compound to prepare a solution of the mixture (hereinafter referred to polyamic acid ester-metal mixture). The use of an organometallic compound may be preferable if compared with the use of a metal because the former is more easily soluble to an organic solvent. While no limitation is imposed to the metal to be used for the purpose of the invention, it may conveniently be selected from Pd, Ru, Ag, Cu, Cr, Tb, Cd, Fe, Pb and Zn. An organometallic compound that can form a complex with the ester moiety of polyamic acid ester to a small extent is particularly preferable for the purpose of the invention.

More specifically, a preferable organometallic compound is either a compound having one or two uncoordinated ligands or a compound saturated with ligands, of which one or two can easily be detached. Since polyamic acid ester and a metal can form a complex, a mixture of polyamic acid ester and a metal will be hereinafter referred to as polyamic acid ester-metal complex.

Now, organometallic compounds that can be used for the purpose of the invention will be described by way of an organic palladium compound, although any other known appropriate organometallic compounds can also be used.

Formula (5) below shows the structure of a typical organic palladium compound.

$$Pd^{2+}[R^4COO^-]_2[R^5R^6R^7N]_2 \qquad (5)$$

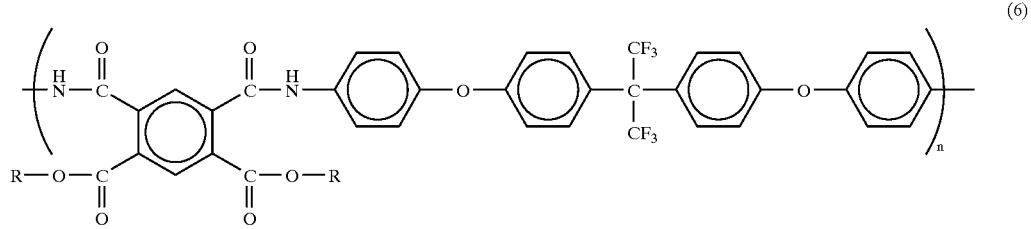

where $R^4$ represents a hydrocarbon chain having 1 to 4 carbon atoms and each of $R^5$, $R^6$ and $R^7$ represents a hydrocarbon chain having 1 to 30 carbon atoms. Specifically, they may be selected from a methyl group, a decyl group, a octadecyl group and other appropriate groups.

One or two of $R^5$, $R^6$ and $R^7$ may be a hydrogen atom. In other words, the alkylamine coordinated to palladium may be primary, secondary or tertiary. Part or all of the hydrogen atoms of $R^5$, $R^6$ and $R^7$ may be replaced by fluorine atoms.

A polyamic acid ester-palladium complex prepared by using an organic palladium complex and polyamic acid ester is then stacked on a substrate by appropriate means to form a film of the polyamic acid ester-palladium complex. Since the polyamic acid ester-palladium complex is not gelled, it can be stacked on the substrate by means of any known appropriate thin form forming technique selected from spin coating, dipping, the Langmuir-Blodgett's technique (hereinafter referred to as LB technique) and other methods.

Since the material comprises both hydrophilic and hydrophobic components, a film having a uniformity of thickness can be formed on a substrate by spin coating and a film having a more uniform thickness can be obtained by using the LB technique.

As described earlier, an electroconductive thin film according to the invention can be used for a liquid crystal device. Now, a method of preparing a liquid crystal device according to the invention will be described.

Figure 2:
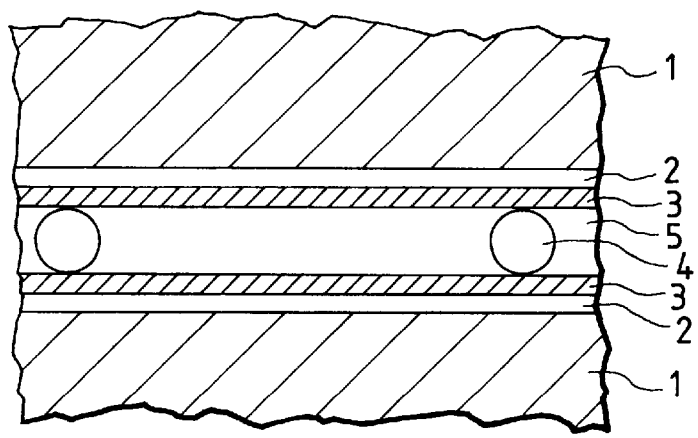
FIG. 2 is a schematic sectional view of a ferroelectric liquid crystal device according to the invention.

Referring to FIG. 2, ITO is deposited to a desired thickness to form transparent electrodes 2 on a pair of glass substrate 1 by an appropriate means such as reactive sputtering, which are then cleaned and the surface is processed to become hydrophobic.

Then, a mixture of a DMAc solution of polyamic acid methyl ester with chemical formula (6) below and an organometallic complex according to the invention is applied to a substrate (preferably a silicon wafer) by means of a know application method.

The product is then heated in an electric furnace to form a liquid crystal alignment layer 3 made of a polyimide with chemical formula (7) below and a metal. The liquid crystal alignment layer has a film thickness of preferably tens of several nanometers and more preferably less than 15 nanometers. Then, the surface of the liquid crystal alignment layer is subjected to a rubbing operation.

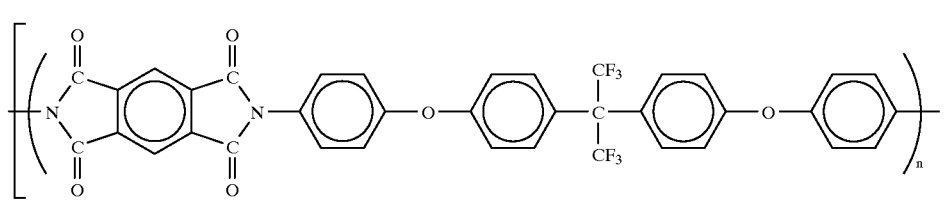

Thereafter, alumina beads of an appropriate size are spread on one of the substrates as spacers 4 and the substrates are laid one on the other to form a cell in such a way that their rubbing directions show a desired angle. Then, liquid crystal is injected into the cell to produce a liquid crystal device.

As described earlier, another application of an electroconductive thin film according to the invention is a surface conduction electron-emitting device.

Now, a surface conduction electron-emitting device according to the invention will be described.

Two types of surface conduction electron-emitting device are possible for the purpose of the invention; a plane type and a step type. Firstly, the basic configuration of a plane type surface conduction electron-emitting device will be described.

Figure 4A:
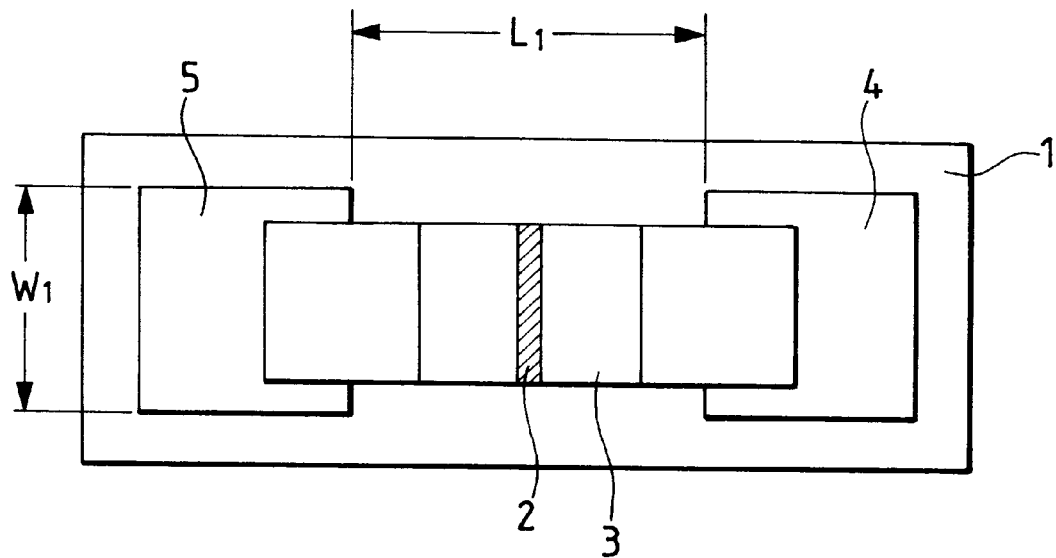
FIGS. 4A and 4B are schematic sectional views of a preferred embodiment of surface conduction electron-emitting device according to the invention.
Figure 4B:
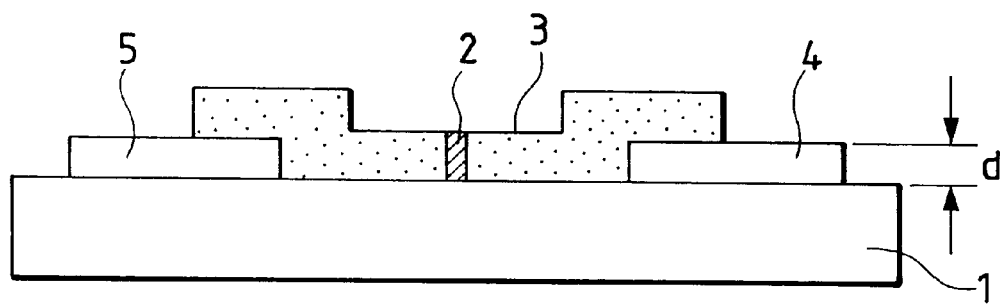

FIGS. 4A and 4B are schematic views showing a plane type surface conduction electron-emitting device according to the invention.

Referring to FIGS. 4A and 4B, the device comprises a substrate 1, an electron-emitting region 2, an electroconductive thin film 3 and a pair of device electrodes 4 and 5.

Materials that can be used for the substrate 1 include quartz glass, glass containing impurities such as Na to a reduced concentration level, soda lime glass, glass substrate realized by forming an $SiO_2$ layer on soda lime glass by means of sputtering, ceramic substances such as alumina.

While the oppositely arranged device electrodes 4 and 5 may be made of any highly conducting material, preferred candidate materials include metals such as Ni, Cr, Au, Mo, W, Pt, Ti, Al, Cu and Pd and their alloys, printable conducting materials made of a metal or a metal oxide selected from Pd, Ag, $RuO_2$, Pd—Ag and glass, transparent conducting materials such as $In_2O_3$—$SnO_2$ and semiconductor materials such as polysilicon.

The distance $L_1$ separating the device electrodes, the length $W_1$ of the device electrodes, the contour of the electroconductive film 3 and other factors for designing a surface conduction electron-emitting device according to the invention may be determined depending on the application of the device.

The distance $L_1$ separating the device electrodes 4 and 5 is preferably between several hundreds nanometers and several hundreds micrometers and, still preferably, between several micrometers and tens of several micrometers depending on the voltage to be applied to the device electrodes and so on.

The length $W_1$ of the device electrodes is preferably between several micrometers and hundreds of several micrometers depending on the resistance of the electrodes and the electron-emitting characteristics of the device. The film thickness d of the device electrodes is between several hundred angstroms and several micrometers.

While the surface conduction electron-emitting device illustrated in FIGS. 4A and 4B is prepared by sequentially laying device electrodes 4 and 5 and an electroconductive thin film 3 on a substrate 1 to form a multilayer structure, it may alternatively be prepared by laying a thin film 3 including an electron-emitting region on a substrate 1 and then a pair of oppositely disposed device electrodes 4 and 5 on the thin film.

The electroconductive thin film 3 is preferably a fine particle film in order to provide excellent electron-emitting characteristics. The thickness of the electroconductive thin film 3 is determined as a function of the stepped coverage of the electroconductive thin film on the device electrodes 4 and 5, the electric resistance between the device electrodes 4 and 5 and the parameters for the forming operation that will be described later as well as other factors and preferably between several angstroms and thousands of several angstroms and more preferably between ten angstroms and two hundred angstroms. The electroconductive thin film 3 normally shows a resistance per unit surface area between $10^3$ and $10^7 \Omega/\square$.

The electroconductive thin film 3 is made of fine particles of a material selected from metals such as Pd, Ru, Ag, Cu, Cr, Tb, Cd, Fe, Pb and Zn.

The term a "fine particle film" as used herein refers to a thin film constituted of a large number of fine particles that may be loosely dispersed, tightly arranged or mutually and randomly overlapping (to form an island structure under certain conditions). The diameter of fine particles to be used for the purpose of the present invention is preferably between several angstroms and thousands of several angstroms and more preferably between ten angstroms and two hundred angstroms.

The electron-emitting region 2 is part of the electroconductive thin film 3 and comprises an electrically highly resistive gap, although its performance is dependent on the thickness and the material of the electroconductive thin film 3 and the energization forming process which will be described hereinafter. Therefore, the position and the profile of the electron-emitting region 2 are not limited to those illustrated in FIGS. 4A and 4B.

The gap may contain electroconductive fine particles with a diameter between several and several hundred angstroms. These electroconductive fine particles are made of some or all of the elements constituting the electroconductive thin film 3. The electron-emitting region 2 including the gap and the neighboring areas of the electroconductive thin film 3 may contain carbon and carbon compounds.

A surface conduction type electron emitting device according to the invention and having an alternative profile, or a step type surface conduction electron-emitting device, will now be described.

Figure 5:
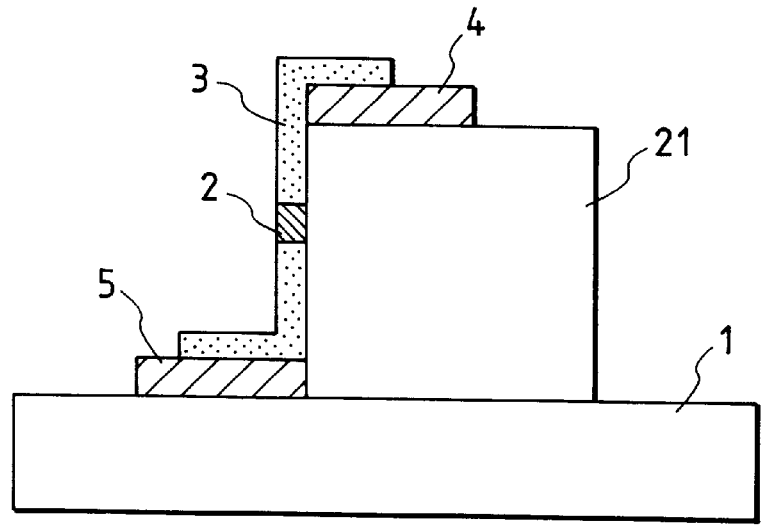
FIG. 5 is a schematic sectional view of another preferred embodiment of surface conduction electron-emitting device according to the invention.

FIG. 5 is a schematic sectional side view of a step type surface conduction electron emitting device, to which the present invention is applicable. Reference symbol 21 denotes a step-forming section in FIG. 5. Otherwise, those components that are same or similar to those of FIGS. 4A and 4B are denoted respectively by the same reference symbols.

The device comprises a substrate 1, an electron-emitting region 2, an electroconductive thin film 3 and a pair of device electrodes 4 and 5, which are made of materials same as those of a plane type surface conduction electron-emitting device as described above.

The step-forming section 21 is made of an insulating material such as $SiO_2$ produced by vacuum deposition, printing or sputtering and having a film thickness corresponding to the distance $L_1$ (FIGS. 4A and 4B) separating the device electrodes of a plane type surface conduction electron-emitting device as described above, or between several hundred angstroms and tens of several micrometers. The film thickness of the step-forming section 21 is preferably between several hundred angstroms and tens of several nanometers and more preferably between several hundred angstroms and several micrometers, although it is selected as a function of the method of producing the step-forming section used there, the voltage to be applied to the device electrodes and so on.

As the electroconductive thin film 3 is formed after the device electrodes 4 and 5, it may preferably be laid on the device electrodes 4 and 5, although the device electrodes 4 and 5 may alternatively be laid after forming the electroconductive thin film 3 so that the latter is found on the device electrodes 4 and 5. While the electron-emitting region 2 is formed in the step-forming section 21 in FIG. 5, its location and contour are dependent on the conditions under which it is prepared, the energization forming conditions and other related conditions and not limited to those shown there.

A method of manufacturing a plane type surface conduction electron-emitting device will be described below, although the following description is mostly applicable to a step type surface conduction electron-emitting device.

Figure 6A:
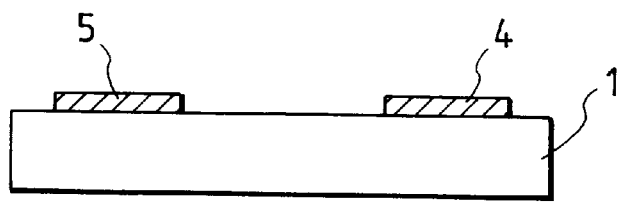
FIGS. 6A, 6B and 6C are schematic views of still another embodiment of surface conduction electron-emitting device according to the invention, showing different manufacturing steps.
Figure 6B:
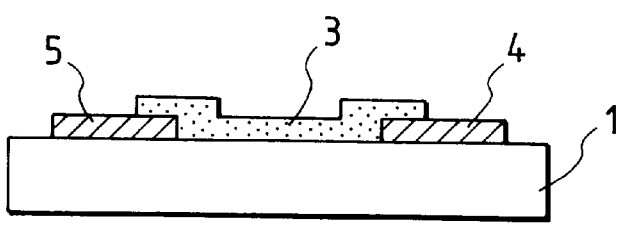
Figure 6C:
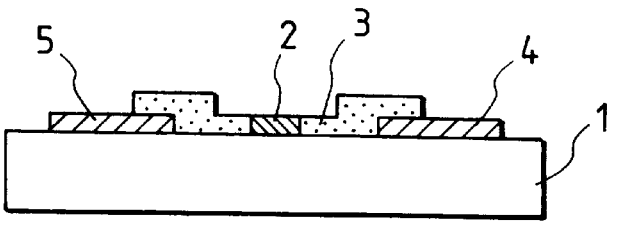

While a number of different methods may be conceivable for manufacturing a surface conduction electron-emitting device according to the invention, a typical method will be described by referring to FIGS. 6A through 6C. In FIGS. 6A through 6C, those components that are same or similar to those of FIGS. 4A and 4B are denoted respectively by the same reference symbols.

1) After thoroughly cleansing a substrate 1 with detergent and pure water, a material is deposited on the substrate 1 by means of vacuum deposition, sputtering or some other appropriate technique for a pair of device electrodes 4 and 5, which are then produced by photolithography (FIG. 6A).

2) A material for an electroconductive thin film is formed on the entire surface of the substrate 1 carrying thereon the pair of device electrodes 4 and 5 by appropriate means selected from rotary application, dipping, the LB method and other techniques. For the purpose of the present invention, preferably the technique of rotary application and more preferably the LB technique is used from the viewpoint of a uniform thickness of the applied film and the controllability of the film thickness.

After depositing a material for forming an electroconductive thin film on the substrate to a desired thickness, the material is irradiated with ultraviolet rays in an $O_3$ containing atmosphere to decompose the material at the organic moiety of the material. The rate at which the decomposition proceeds is accelerated by conducting the ultraviolet ray irradiation in an $O_3$ containing atmosphere or while introducing oxygen and heating the material. Care should be taken, however, not to melt the formed thin film by heat because the film can easily be heated at an area in the vicinity of the source of ultraviolet rays.

While the time during which the operation of ultraviolet ray irradiation is conducted depends on the intensity of ultraviolet rays, the ozone concentration, the film material and other factors, the complex has to be decomposed by at least 50% at organic moieties in the film. The complex is decomposed preferably by more than 90% and more preferably by more than 99% in order to minimize the possible aggregation of the molten film material in the subsequent heating and baking process.

When the step of ultraviolet ray irradiation is over, the film is subjected to a heating and baking step. This operation is preferably conducted at temperature higher than 250° C. for a period of approximately 10 minutes or more.

Thereafter, the organometallic thin film is subjected to a patterning operation, using an appropriate technique such as lift-off or etching, to produce an electroconductive thin film 3 (FIG. 6B).

When forming a film out of a material of the above described type by means of the LB technique for the purpose of the invention, the lower phase water of the reaction system is not necessarily required to contain metal ions and pure water may be used for it so that the overall cost of forming such a film can be significantly reduced and no considerations may be required for disposing the wasted lower phase water.

3) Thereafter, the deposited electroconductive thin film is subjected to a process referred to as "forming". More specifically, the device electrodes 4 and 5 are electrically energized by means of a power source (not shown) until an electron emitting region 2 is produced in a given area of the electroconductive thin film 3 to show a modified structure that is different from that of the electroconductive thin film 3 (FIG. 6C). In other words, the electron-emitting region 2 is produced by locally destroying, deforming or transforming the electroconductive thin film 3 to show a modified structure.

Figure 7A:
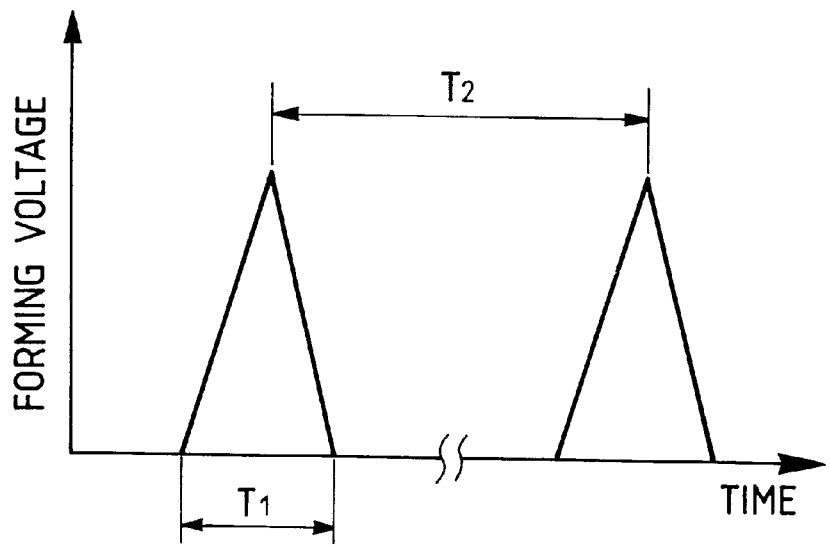
FIGS. 7A and 7B are graphs schematically showing pulse voltage waveforms that can be used for a forming process of manufacturing a surface conduction electron-emitting device according to the invention.
Figure 7B:
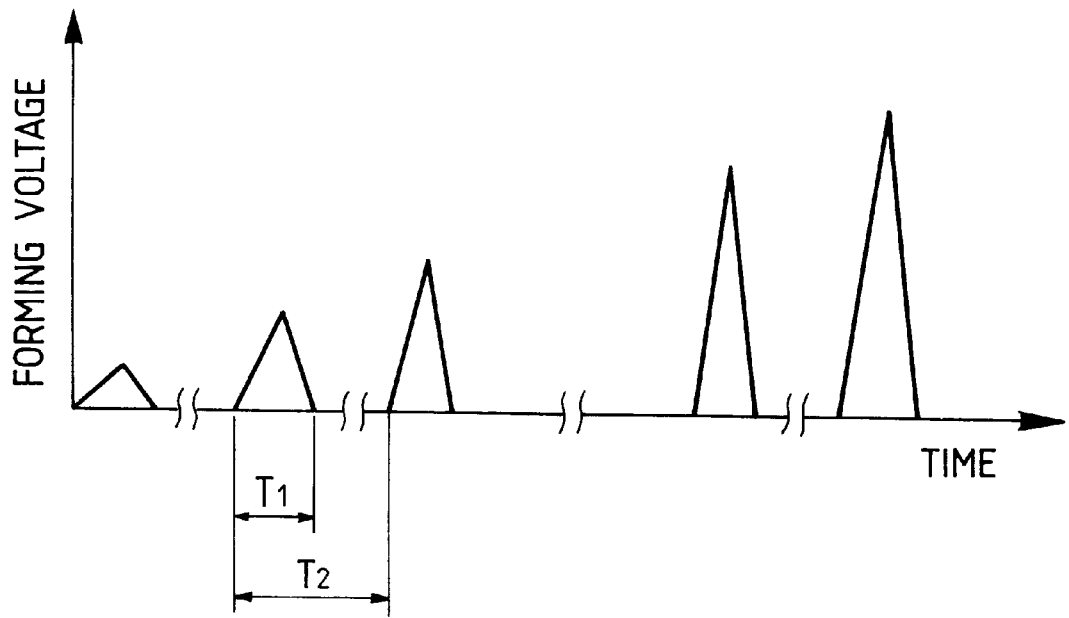

FIGS. 7A and 7B shows two different pulse voltages that can be used for energization forming.

The voltage to be used for energization forming preferably has a pulse waveform. A pulse voltage having a constant height or a constant peak voltage may be applied continuously (FIG. 7A) or, alternatively, a pulse voltage having an increasing height or an increasing peak voltage may be applied (FIG. 7B).

Firstly the use of a pulse voltage having a constant wave height will be described by referring to FIG. 7A.

In FIG. 7A, the pulse voltage has a pulse width T1 and a pulse interval T2, which are typically between 1 $\mu$sec. and 10 msec. and between 10 $\mu$sec. and 100 msec. respectively. The height of the triangular wave (the peak voltage for the energization forming operation) may be appropriately selected depending on the profile of the surface conduction electron-emitting device. The voltage is typically applied for tens of several minutes in vacuum having an appropriate degree of vacuum. Note, however, that the pulse waveform is not limited to triangular and a rectangular or some other waveform may alternatively be used.

FIG. 7B shows a pulse voltage whose pulse height increases with time.

In FIG. 7B, the pulse voltage has a width T1 and a pulse interval T2 that are substantially similar to those of FIG. 7A. The height of the triangular wave (the peak voltage for the energization forming operation) is increased at a rate of, for instance, 0.1 V per step. The voltage is applied in vacuum as in the case of the pulse voltage of FIG. 7A.

The energization forming operation will be terminated by measuring the current running through the device electrodes when a voltage that is sufficiently low and cannot locally destroy or deform the electroconductive thin film 3 (FIGS. 4A, 4B and 5) is applied to the device during an interval T2 of the pulse voltage. Typically the energization forming operation is terminated when a resistance greater than 1M ohms is observed for the device current running through the electroconductive thin film 3 while applying a voltage of approximately 0.1 V to the device electrodes.

4) After the energization forming operation, the device is preferably subjected to an activation process.

In an activation process, a pulse voltage is repeatedly applied to the device in vacuum of typically between $10^{-4}$ and $10^{-5}$ torr as in the case of the forming process. In this process, carbon or a carbon compound contained in the organic substances existing in a vacuum atmosphere at a very minute concentration is deposited on the electron-emitting region 2 to give rise to a remarkably change in the device current and the emission current of the device. The activation process is normally conducted, while observing the device current If and the emission current, and terminated when the emission current gets to a saturated level.

For the purpose of the present invention, carbon and a carbon compound refer to graphite and noncrystalline carbon (amorphous carbon, a mixture of amorphous carbon and fine graphite crystal) and the thickness of the deposit of such carbon or a carbon compound is preferably less than 500 angstroms and more preferably less than 300 angstroms.

5) An electron-emitting device that has been treated in an energization forming process and an activation process is then preferably driven to operate in vacuum of a vacuum degree higher than those of the forming and activation processes. More preferably, the device is driven to operate after having been heated in vacuum of such a high vacuum degree at 80° C. to 250° C.

More specifically, a vacuum degree higher than those of the forming and activation processes typically refers to a vacuum degree greater than $5 \times 10^{-6}$ torr and preferably to an ultra-high vacuum state in which no additional carbon and/or carbon compounds can be deposited on the device.

As a result of step 5 above, the formation of any additional deposit of carbon or a carbon compound can be effectively suppressed to consequently stabilize the device current and the emission current.

The performance of a surface conduction electron-emitting device prepared by way of the above processes will be described below.

Figure 8:
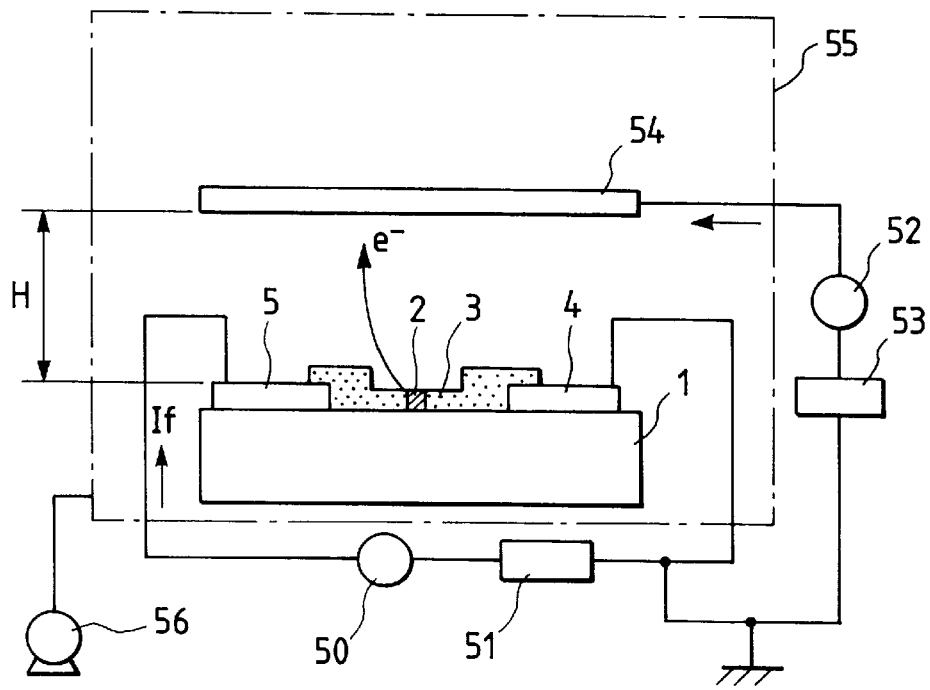
FIG. 8 is a block diagram of a gauging system for determining the electron emitting performance of a surface conduction electron-emitting device according to the invention.

FIG. 8 is a schematic block diagram of a gauging system for determining the electron-emitting performance of a surface conduction electron emitting device.

Referring to FIG. 8, the components that are same or similar to those of FIGS. 4A and 4B are denoted by the same reference symbols respectively. Otherwise, the gauging system has a power source 51 for applying a device voltage Vf to the device, an ammeter 50 for metering the device current If running through the electroconductive thin film 3 between the device electrodes 4 and 5, an anode 54 for capturing the emission current Ie produced by electrons emitted from the electron-emitting region of the device, a high voltage source 53 for applying a voltage to the anode 54 of the gauging system and another ammeter 52 for metering the emission current Ie produced by electrons emitted from the electron-emitting region 2 of the device as well as a vacuum chamber 55 and a vacuum pump 56.

The surface conduction electron-emitting device, the anode 54 and other components are arranged within the vacuum chamber 55, which vacuum chamber 55 is provided with equipment necessary for operating a vacuum system so that the performance of the surface conduction electron-emitting device can be observed in vacuum of a desired vacuum degree.

The vacuum pump 56 is provided with an ordinary high vacuum system comprising a turbo pump or a rotary pump or an oil-free high vacuum system comprising an oil-free pump such as a magnetic levitation turbo pump or a dry pump and an ultra-high vacuum system comprising an ion pump. The entire vacuum chamber 55 and the substrate of the surface conduction electron-emitting device contained therein can be heated to 250° C. by means of a heater. Thus, it will be understood that, by using a display panel which will be described hereinafter (201 in FIG. 11) and its internal components as a vacuum chamber and its internal components, all the processes from the energization forming process on can be carried out with this arrangement.

For determining the performance of the electron-emitting device, a voltage between 1 and 10 KV may be applied to the anode, which is spaced apart from the electron emitting device by distance H which is between 2 and 8 mm.

Figure 9:
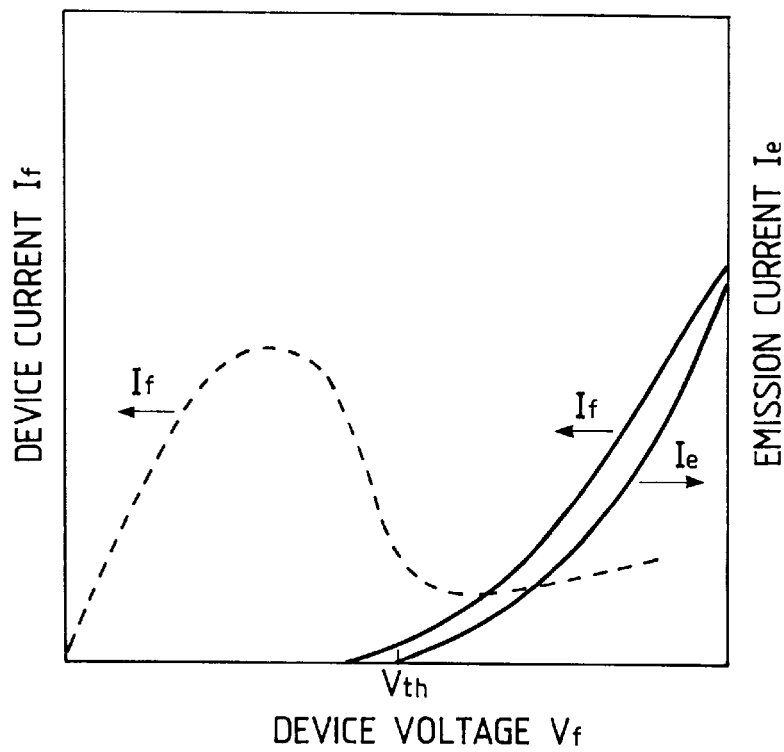
FIG. 9 is a graph showing the electron-emitting performance of a surface conduction electron-emitting device according to the invention.

FIG. 9 shows a graph schematically illustrating the relationship between the device voltage Vf and the emission current Ie and the device current If typically observed by the gauging system of FIG. 8. Note that different units are arbitrarily selected for Ie and If in FIG. 9 in view of the fact that Ie has a magnitude by far smaller than that of If. Note that both the vertical and transversal axes of the graph represent a linear scale.

As seen in FIG. 9, an electron-emitting device according to the invention has three remarkable features in terms of emission current Ie, which will be described below.

Firstly, an electron-emitting device according to the invention shows a sudden and sharp increase in the emission current Ie when the voltage applied thereto exceeds a certain level (which is referred to as a threshold voltage hereinafter and indicated by Vth in FIG. 9), whereas the emission current Ie is practically undetectable when the applied voltage is found lower than the threshold value Vth. Differently stated, an electron-emitting device according to the invention is a non-linear device having a clear threshold voltage Vth to the emission current Ie.

Secondly, since the emission current Ie is highly dependent on the device voltage Vf, the former can be effectively controlled by way of the latter.

Thirdly, the emitted electric charge captured by the anode 54 (FIG. 8) is a function of the duration of time of application of the device voltage Vf. In other words, the amount of electric charge captured by the anode 54 can be effectively controlled by way of the time during which the device voltage Vf is applied.

On the other hand, the device current If either monotonically increases relative to the device voltage Vf, a characteristic referred to as "MI characteristic" hereinafter, as indicated by a solid line in FIG. 9 or changes to show a curve specific to a voltage-controlled-negative-resistance characteristic (a characteristic referred to as "VCNR characteristic" hereinafter) as indicated by a broken line in FIG. 9. These different characteristics of the device current are dependent on a number of factors including the manufacturing method, the conditions where it is gauged and the environment for operating the device. Note, however, that, if the device current If shows a VCNR characteristic to the device voltage Vf in a surface conduction electron-emitting device, the emission current Ie will show an MI characteristic to the device voltage Vf.

Now, an electron source comprising a number of surface conduction electron-emitting devices according to the invention will be described.

Electron-emitting devices may be arranged on a substrate in a number of different modes. For instance, a number of electron-emitting devices may be arranged in parallel rows along a same direction to realize a ladder-like arrangement. Alternatively, a total of n Y-directional wires may be arranged on a total of m X-directional wires with an interlayer insulation layer arranged therebetween in such a way that the device electrodes of each surface conduction electron-emitting device are connected to one of the X-directional wires and one of the Y-directional wires. The latter arrangement is referred to as a simple matrix arrangement. Now, the simple matrix arrangement will be described in detail.

In view of the above described three basic characteristic features of a surface conduction electron-emitting device according to the invention, it can be controlled for electron emission by controlling the wave height and the wave width of the pulse voltage applied to the opposite electrodes of the device above the threshold voltage level. On the other hand, the device does not practically emit any electron below the threshold voltage level. Therefore, regardless of the number of electron-emitting devices arranged in an apparatus, desired surface conduction electron-emitting devices can be selected and controlled for electron emission in response to an input signal by applying a pulse voltage to each of the selected devices.

An electron source having a simple matrix arrangement as described above will be now described by referring to FIG. 10.

Figure 10:
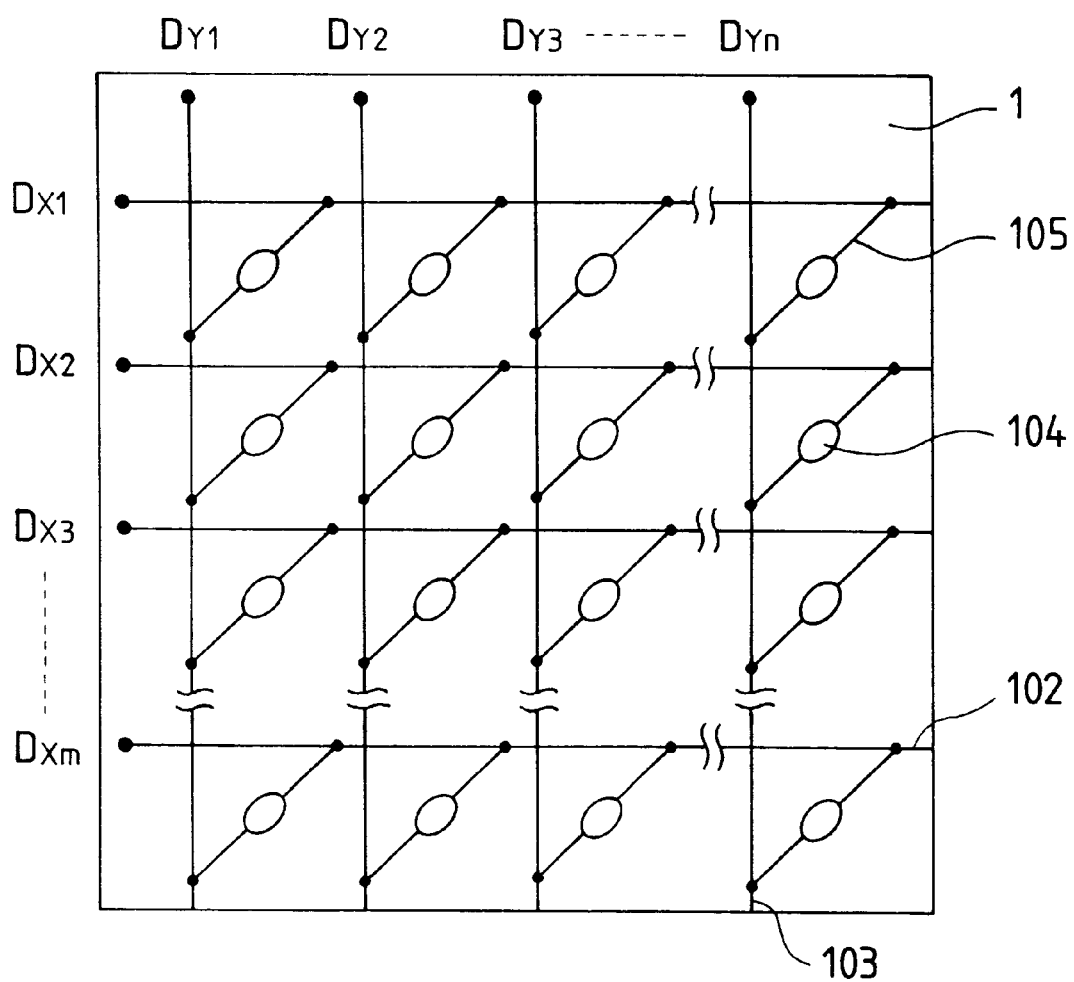
FIG. 10 is a schematic plan view of a simple matrix type electron source according to the invention.

Referring to FIG. 10, the electron source comprises a substrate 1 which is typically made of glass and a plurality of surface conduction electron-emitting devices whose number and configuration may be appropriately selected depending on the application.

There are provided a total of m X-directional wires 102 arranged on the substrate 1, which are donated by Dx1, Dx2, . . . , Dxm and made of an electroconductive metal produced by vacuum deposition, printing or sputtering. These wires are so designed in terms of material, thickness and width that, if necessary, a substantially equal voltage may be applied to the surface conduction electron-emitting devices 104.

A total of n Y-directional wires 103 are arranged and donated by Dy1, Dy2, . . . , Dyn, which are similar to the X-directional wires 102 in terms of material, thickness and width.

An interlayer insulation layer (not shown) is disposed between the m X-directional wires 102 and the n Y-directional wires 103 to electrically isolate them from each other. Both m and n are integers.

The interlayer insulation layer (not shown) is typically made of $SiO_2$ and formed on the entire surface or part of the surface of the insulating substrate 1, on which the Y-directional wires are formed, to show a desired contour by means of vacuum deposition, printing or sputtering. The thickness, material and manufacturing method of the interlayer insulation layer are so selected as to make it withstand the potential difference between any of the X-directional wires 102 and any of the Y-directional wire 103 observable at the crossing thereof.

The oppositely arranged electrodes (not shown) of each of the surface conduction electron-emitting devices 104 are connected to related one of the m X-directional wires 102 and related one of the n Y-directional wires 103 by respective connecting wires 105 which are made of an electroconductive metal and formed by appropriate means such as vapor deposition, printing or sputtering.

The electroconductive metal material of the device electrodes and that of the connecting wires 105 extending from the m X-directional wires 102 and the n Y-directional wires 103 may be same or contain a common element as an ingredient. Alternatively, they may be different from each other. If the device electrodes and the connecting wires are made of a same material, they may be collectively called device electrodes without discriminating the connecting wires. The surface conduction electron-emitting devices 104 may be formed either on the substrate 1 or on the interlayer insulation layer (not shown).

The X-directional wires 102 are electrically connected to a scan signal application means (not shown) for applying a scan signal to a selected row of surface conduction electron-emitting devices 104.

On the other hand, the Y-directional wires 103 are electrically connected to a modulation signal generation means (not shown) for applying a modulation signal to a selected column of surface conduction electron-emitting devices 104 and modulating the selected column according to an input signal. Note that the drive signal to be applied to each surface conduction electron-emitting devices 104 is expressed as the voltage difference of the scan signal and the modulation signal applied to the device.

Figure 11:
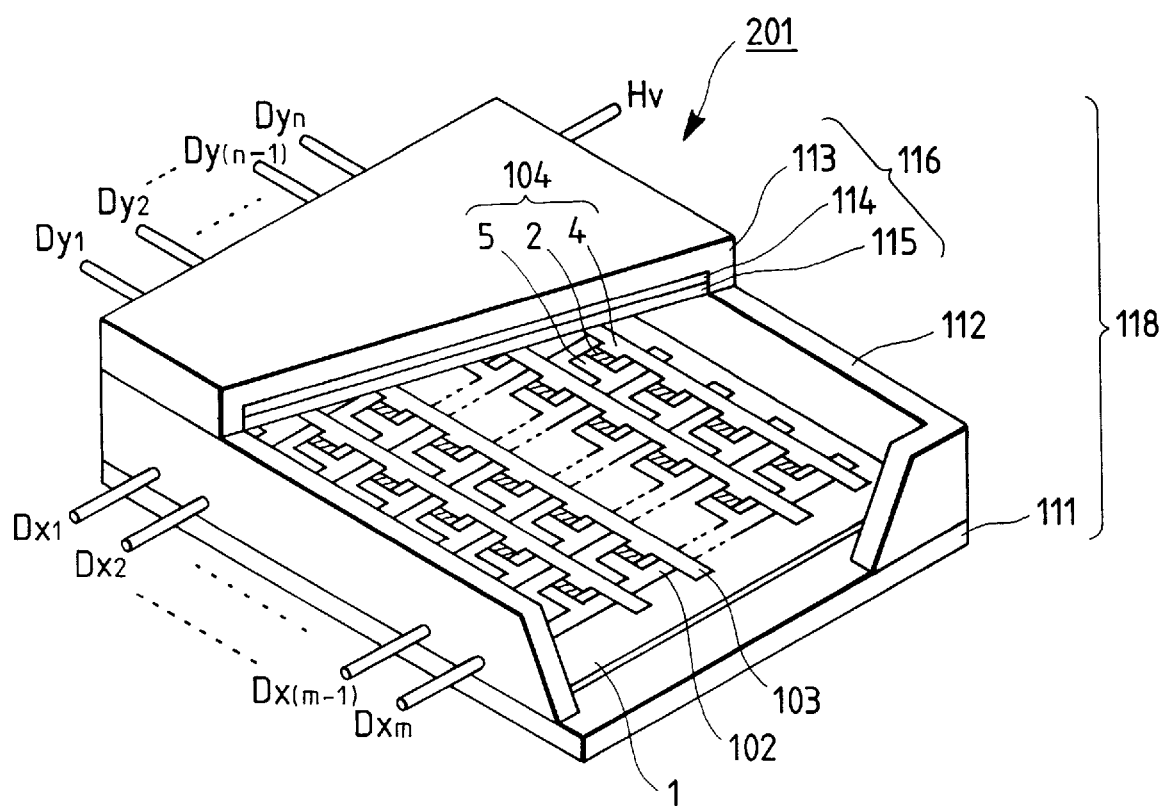
FIG. 11 is a schematic view of the display panel of a preferred embodiment of image-forming apparatus according to the invention.
Figure 12A:
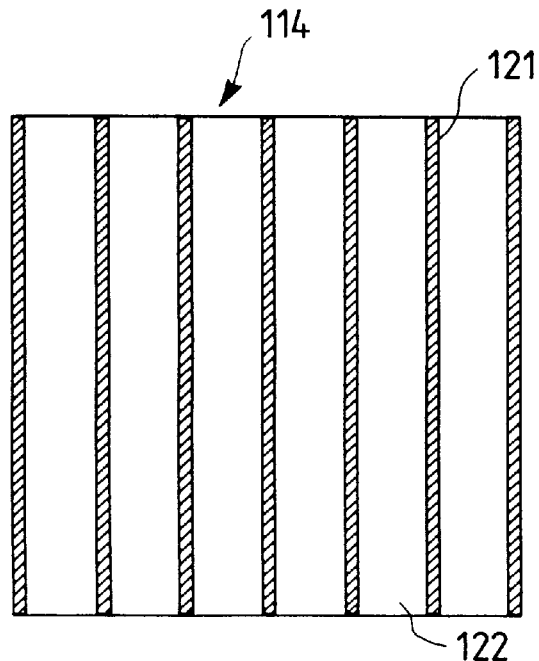
FIGS. 12A and 12B are schematic views, illustrating two possible configurations of the fluorescent film of an image-forming apparatus according to the invention.
Figure 12B:
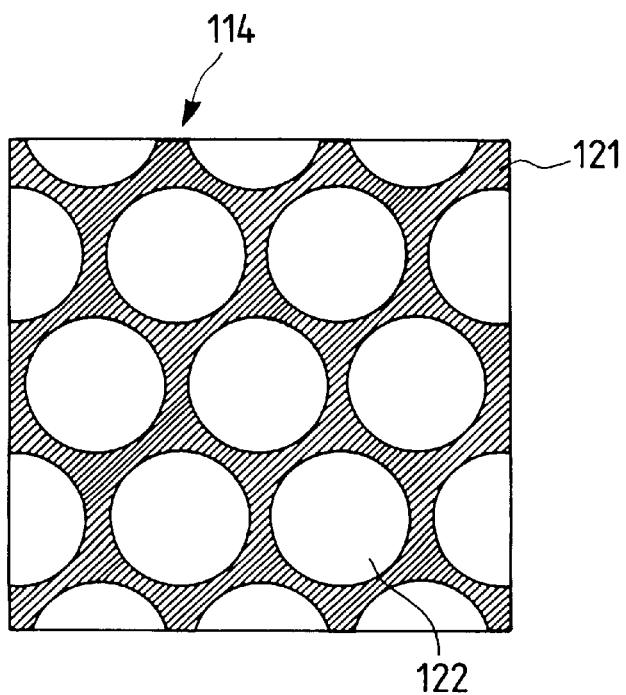
Figure 13:
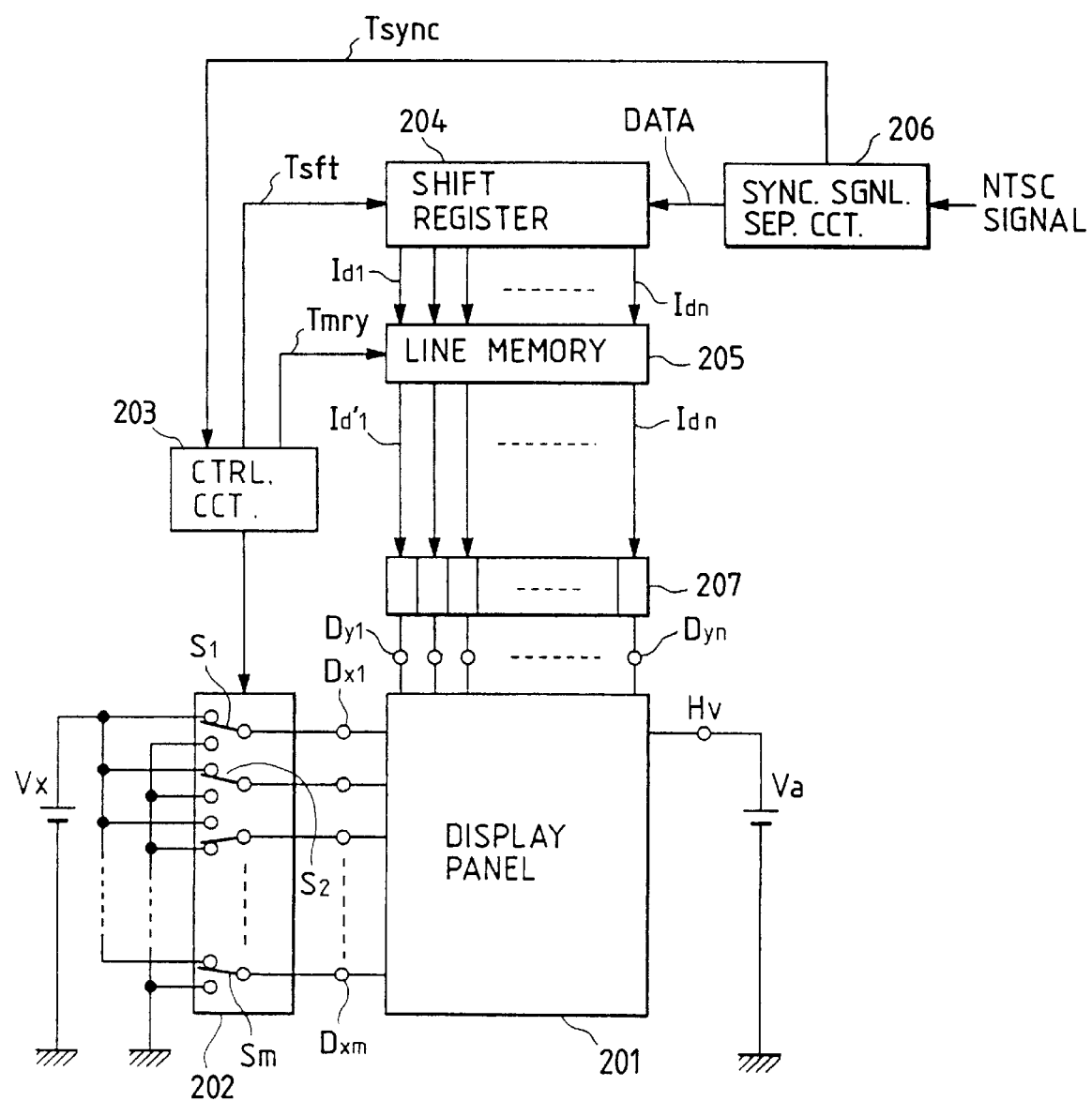
FIG. 13 is a block diagram of a preferred embodiment of image-forming apparatus according to the invention.

Now, an image-forming apparatus comprising an electron source according to the invention and having a simple matrix arrangement as described above will be described by referring to FIGS. 11, 12A, 12B and 13. FIG. 11 is a partially cut away schematic perspective view of the image forming apparatus and FIGS. 12A and 12B are schematic views, illustrating two possible configurations of a fluorescent film 114 that can be used for the image forming apparatus of FIG. 11, whereas FIG. 13 is a block diagram of a drive circuit for the display panel 201 of the image forming apparatus of FIG. 11 that operates for NTSC television signals.

Referring firstly to FIG. 11 illustrating the basic configuration of the display panel of the image-forming apparatus, it comprises an electron source substrate 1 of the above described type carrying thereon a plurality of electron-emitting devices, a rear plate 111 rigidly holding the electron source substrate 1, and a face plate 116 prepared by laying a fluorescent film 114 and a metal back 115 on the inner surface of a glass substrate 113 and a support frame 112, to which the rear plate 111 and the face plate 116 are bonded by means of frit glass to form an envelope 118, which is then baked to 400 to 500° C. for more than 10 minutes in the atmosphere or in nitrogen and hermetically and airtightly sealed.

In FIG. 11, reference numeral 2 denotes an electron-emitting region and reference numerals 102 and 103 respectively denotes the X-directional wire and the Y-directional wire connected to the respective device electrodes 4 and 5 of each electron-emitting device 104. The m X-directional wires and n Y-directional wires are connected to respective external terminals Dx1 through Dxm and Dy1 through Dyn.

While the envelope 118 is formed of the face plate 116, the support frame 112 and the rear plate 111 in the above described embodiment, the rear plate 111 may be omitted if the substrate 1 is strong enough by itself because the rear plate 111 is provided mainly for reinforcing the substrate 1. If such is the case, an independent rear plate 111 may not be required and the substrate 1 may be directly bonded to the support frame 111 so that the envelope 118 is constituted of a face plate 116, a support frame 112 and a substrate 111. The overall strength of the envelope 118 may be increased by arranging a number of support members called spacers (not shown) between the face plate 116 and the rear plate 111.

FIGS. 12A and 12B schematically illustrate two possible arrangements of fluorescent film. While the fluorescent film 114 comprises only a single fluorescent body if the display panel is used for showing black and white pictures, it needs to comprise for displaying color pictures black conductive members 121 and fluorescent bodies 122, of which the former are referred to as black stripes or members of a black matrix depending on the arrangement of the fluorescent bodies. Black stripes or members of a black matrix are arranged for a color display panel so that the fluorescent bodies 122 of three different primary colors are made less discriminable and the adverse effect of reducing the contrast of displayed images of external light is weakened by blackening the surrounding areas. While graphite is normally used as a principal ingredient of the black stripes, other conductive material having low light transmissivity and reflectivity may alternatively be used.

A precipitation or printing technique is suitably be used for applying fluorescent bodies 122 on the glass substrate 113 regardless of black and white or color display.

As shown in FIG. 11, an ordinary metal back 115 is arranged on the inner surface of the fluorescent film 114. The metal back 115 is provided in order to enhance the luminance of the display panel by causing the rays of light emitted from the fluorescent bodies 122 (FIGS. 12A and 12B) and directed to the inside of the envelope to turn back toward the face plate 115, to use it as an electrode for applying an accelerating voltage to electron beams and to protect the fluorescent bodies 122 against damages that may be caused when negative ions generated inside the envelope collide with them. It is prepared by smoothing the inner surface of the fluorescent film 114 (in an operation normally called "filming") and forming an Al film thereon by vacuum deposition after forming the fluorescent film 114.

A transparent electrode (not shown) may be formed on the face plate 116 facing the outer surface of the fluorescent film 114 in order to raise the conductivity of the fluorescent film 114.

Care should be taken to accurately align each set of color fluorescent bodies 122 and an electron-emitting device 104, if a color display is involved, before the above listed components of the envelope are bonded together.

The envelope 118 is evacuated by means of an appropriate vacuum pump and an exhaust pipe (not shown) to a degree of vacuum of $10^{-7}$ torr. A getter process may be conducted in order to maintain the achieved degree of vacuum in the inside of the envelope 118 after it is sealed. In a getter process, a getter (not shown) arranged at a predetermined position in the envelope 118 is heated by means of a resistance heater or a high frequency heater to form a film by vapor deposition immediately before or after the envelope 118 is sealed. A getter typically contains Ba as a principal ingredient and can maintain a degree of vacuum between $1 \times 10^{-4}$ and $1 \times 10^{-7}$ by the adsorption effect of the vapor deposition film.

The processes of manufacturing surface conduction electron-emitting devices of the image forming apparatus after the forming process may appropriately be designed to meet the specific requirements of the intended application.

Now, a drive circuits for driving a display panel 201 comprising an electron source as described above will be described by referring to FIG. 13. In FIG. 13, reference numeral 201 denotes a display panel. Otherwise, the circuit comprises a scan circuit 202, a control circuit 203, a shift register 204, a line memory 205, a synchronizing signal separation circuit 206 and a modulation signal generator 207. Vx and Va in FIG. 13 denote DC voltage sources.

As shown in FIG. 13, the display panel 201 is connected to external circuits via terminals Dx1 through Dxm, Dy1 through Dyn and high voltage terminal Hv, of which terminals Dx1 through Dxm are designed to receive scan signals for sequentially driving on a one-by-one basis the rows (of n devices) of an electron source in the apparatus comprising a number of surface-conduction type electron-emitting devices arranged in the form of a matrix having m rows and n columns.

On the other hand, terminals Dy1 through Dyn are designed to receive a modulation signal for controlling the output electron beam of each of the surface-conduction type electron-emitting devices of a row selected by a scan signal. High voltage terminal Hv is fed by the DC voltage source Va with a DC voltage of a level typically around 10 kV, which is an accelerating voltage sufficiently high to energize the fluorescent bodies of the selected surface-conduction type electron-emitting devices.

The scan circuit 202 operates in a manner as follows. The circuit comprises M switching devices (of which only devices S1 and Sm are specifically indicated in FIG. 13), each of which takes either the output voltage of the DC voltage source Vx or 0[V] (the ground potential level) and comes to be connected with one of the terminals Dx1 through Dxm of the display panel 201. Each of the switching devices S1 through Sm operates in accordance with control signal Tscan fed from the control circuit 203 and can be prepared by combining transistors such as FETs.

The DC voltage source Vx of this circuit is designed to output a constant voltage such that any drive voltage applied to devices that are not being scanned due to the performance of the surface conduction electron-emitting devices (or the threshold voltage for electron emission) is reduced to less than threshold voltage.

The control circuit 203 coordinates the operations of related components so that images may be appropriately displayed in accordance with externally fed video signals. It generates control signals Tscan, Tsft and Tmry in response to synchronizing signal Tsync fed from the synchronizing signal separation circuit 206, which will be described below.

The synchronizing signal separation circuit 206 separates the synchronizing signal component and the luminance signal component form an externally fed NTSC television signal and can be easily realized using a popularly known frequency separation (filter) circuit. Although a synchronizing signal extracted from a television signal by the synchronizing signal separation circuit 206 is constituted, as well known, of a vertical synchronizing signal and a horizontal synchronizing signal, it is simply designated as Tsync signal here for convenience sake, disregarding its component signals. On the other hand, a luminance signal drawn from a television signal, which is fed to the shift register 204, is designed as DATA signal.

The shift register 204 carries out for each line a serial/parallel conversion on DATA signals that are serially fed on a time series basis in accordance with control signal Tsft fed from the control circuit 43. In other words, a control signal Tsft operates as a shift clock for the shift register 204. A set of data for a line that have undergone a serial/parallel conversion (and correspond to a set of drive data for n electron-emitting devices) are sent out of the shift register 204 as n parallel signals Id1 through Idn.

The line memory 205 is a memory for storing a set of data for a line, which are signals Id1 through Idn, for a required period of time according to control signal Tmry coming from the control circuit 203. The stored data are sent out as I'd1 through I'dn and fed to modulation signal generator 207.

Said modulation signal generator 207 is in fact a signal source that appropriately drives and modulates the operation of each of the surface-conduction type electron-emitting devices and output signals of this device are fed to the surface-conduction type electron-emitting devices in the display panel 201 via terminals Dy1 through Dyn.

As described above, a surface conduction electron-emitting device according to the present invention is characterized by that there exists a clear threshold voltage and the device emits electrons only a voltage exceeding is applied thereto. Additionally, the level of emission current changes as a function of the change in the applied voltage above the threshold level, although the value of and the relationship between the applied voltage and the emission current may vary depending on the materials, the configuration and the manufacturing method of the electron-emitting device.

More specifically, when a pulse-shaped voltage is applied to a surface conduction electron-emitting device according to the invention, practically no emission current is generated so far as the applied voltage remains under the threshold level, whereas an electron beam is emitted once the applied voltage rises above the threshold level. It should be noted here that the intensity of an output electron beam can be controlled by changing the peak level Vm of the pulse-shaped voltage. Additionally, the total amount of electric charge of an electron beam can be controlled by varying the pulse width.

Thus, either modulation method or pulse width modulation may be used for modulating an electron-emitting device in response to an input signal. With voltage modulation, a voltage modulation type circuit is used for the modulation signal generator 207 so that the peak level of the pulse-shaped voltage is modulated according to input data, while the pulse width is held constant. With pulse width modulation, on the other hand, a pulse width modulation type circuit is used for the modulation signal generator 207 so that the pulse width of the applied voltage may be modulated according to input data, while the peak level of the applied voltage is held constant.

Although it is not particularly mentioned above, the shift register 204 and the line memory 205 may be either of digital or of analog signal type so long as serial/parallel conversions and storage of video signals are conducted at a given rate.

If digital signal type devices are used, output signal DATA of the synchronizing signal separation circuit 206 needs to be digitized. However, such conversion can be easily carried out by arranging an A/D converter at the output of the synchronizing signal separation circuit 206.

It may be needless to say that different circuits may be used for the modulation signal generator 207 depending on if output signals of the line memory 205 are digital signals or analog signals.

If digital signals are used, a D/A converter circuit of a known type may be used for the modulation signal generator 207 and an amplifier circuit may additionally be used, if necessary. As for pulse width modulation, the modulation signal generator 207 can be realized by using a circuit that combines a high speed oscillator, a counter for counting the number of waves generated by said oscillator and a comparator for comparing the output of the counter and that of the memory. If necessary, an amplifier may be added to amplify the voltage of the output signal of the comparator having a modulated pulse width to the level of the drive voltage of a surface-conduction type electron-emitting device according to the invention.

If, on the other hand, analog signals are used with voltage modulation, an amplifier circuit comprising a known operational amplifier may suitably be used for the modulation signal generator 207 and a level shift circuit may be added thereto if necessary. As for pulse width modulation, a known voltage control type oscillation circuit (VCO) may be used with, if necessary, an additional amplifier to be used for voltage amplification up to the drive voltage of surface-conduction type electron-emitting device.

With an image forming apparatus having a configuration as described above, to which the present invention is applicable, the electron-emitting devices emit electrons as a voltage is applied thereto by way of the external terminals Dx1 through Dxm and Dy1 through Dyn. Then, the generated electron beams are accelerated by applying a high voltage to the metal back 115 or a transparent electrode (not shown) by way of the high voltage terminal Hv. The accelerated electrons eventually collide with the fluorescent film 114, which by turn glows to produce images.

The above described configuration of image forming apparatus is only an example to which the present invention is applicable and may be subjected to various modifications. The TV signal system to be used with such an apparatus is not limited to a particular one and any system such as NTSC, PAL or SECAM may feasibly be used with it. It is particularly suited for TV signals involving a larger number of scanning lines (typically of a high definition TV system such as the MUSE system) because it can be used for a large display panel comprising a large number of pixels.

Now, an electron source comprising a plurality of surface conduction electron-emitting devices arranged in a ladder-like manner on a substrate and an image-forming apparatus comprising such an electron source will be described by referring to FIGS. 14 and 15.

Figure 14:
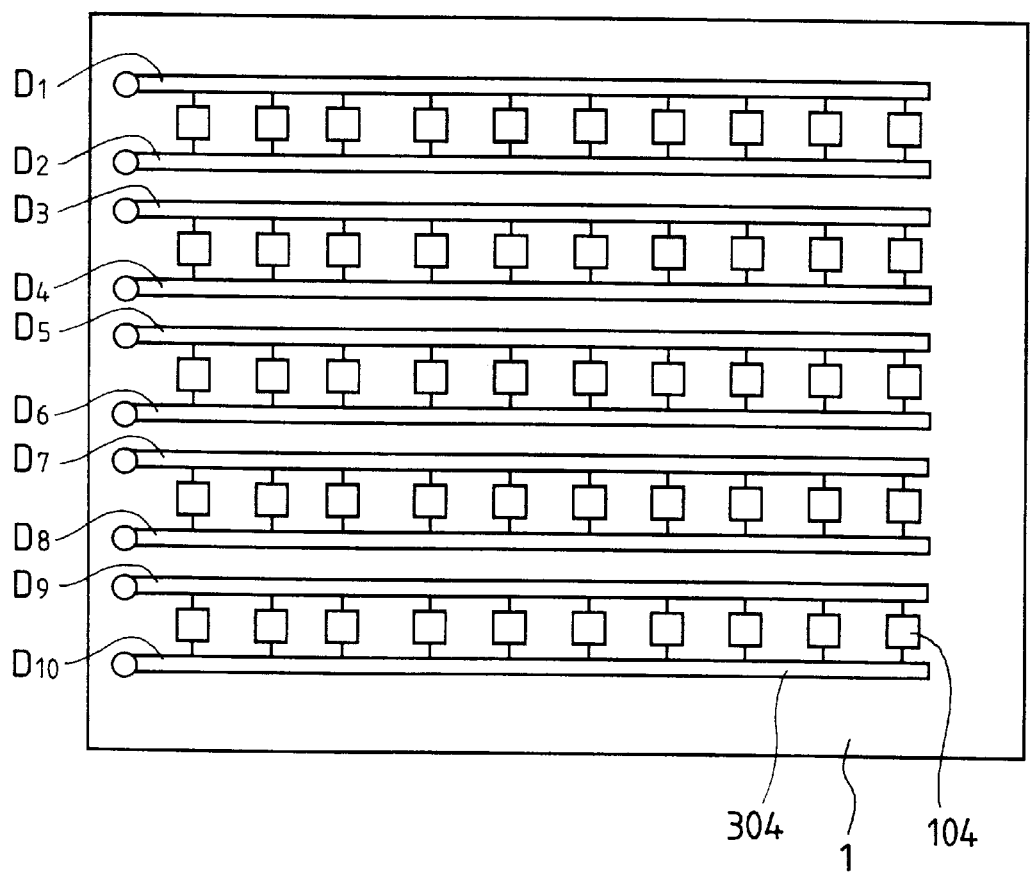
FIG. 14 is a schematic plan view of a ladder type electron source according to the invention.

Firstly referring to FIG. 14, reference numeral 1 denotes an electron source substrate and reference numeral 104 denotes an surface conduction electron-emitting device arranged on the substrate, whereas reference numeral 304 denotes common wires D1 through D10 for connecting the surface conduction electron-emitting devices.

The electron-emitting devices 104 are arranged in rows (to be referred to as device rows hereinafter) to form an electron source comprising a plurality of device rows, each row having a plurality of devices.

The surface conduction electron-emitting devices of each device row are electrically connected in parallel with each other by a pair of common wires 304 (e.g., common wire 304 for external terminals D1 and D2) so that they can be driven independently by applying an appropriate drive voltage to the pair of common wires. More specifically, a voltage exceeding the electron emission threshold level is applied to the device rows to be driven to emit electrons, whereas a voltage below the electron emission threshold level is applied to the remaining device rows. Alternatively, any two external terminals arranged between two adjacent device rows can share a single common wire. Thus, of the common wires D2 through D9, D2 and D3, D4 and D5, D6 and D7 and D8 and D9 can share respective single common wires instead of two wires.

Figure 15:
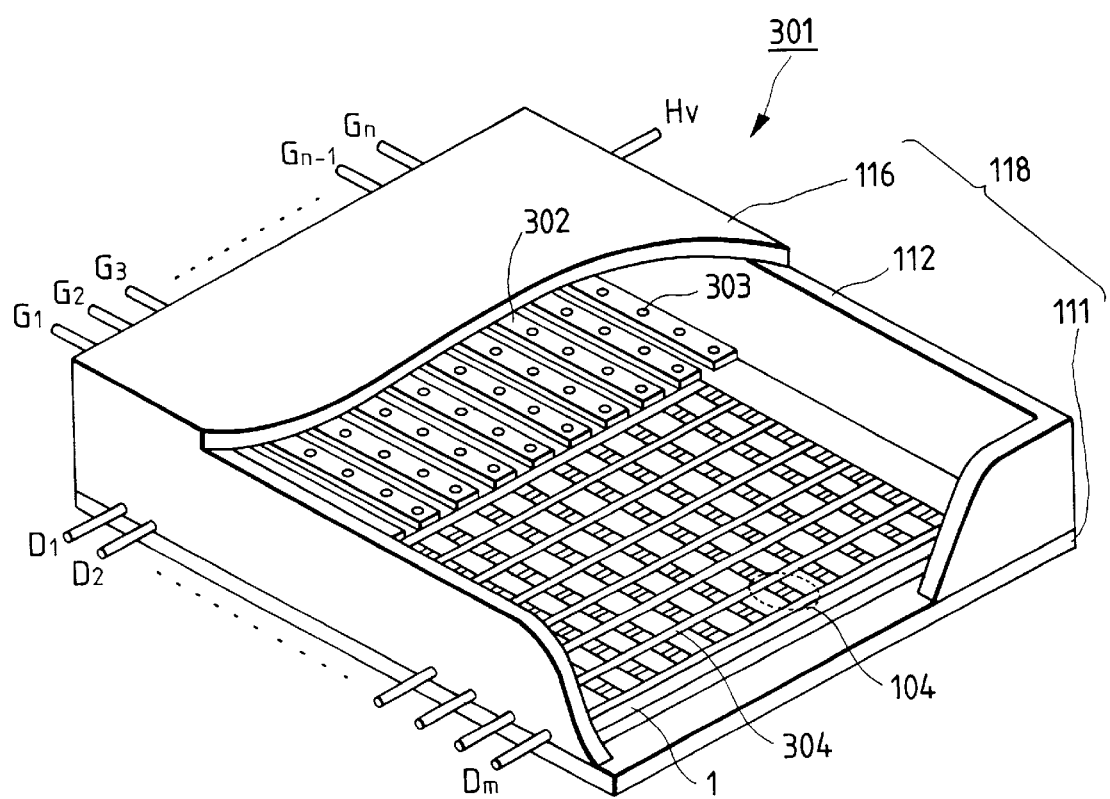
FIG. 15 is a schematic view of a preferred embodiment of image-forming apparatus according to the invention and comprising a ladder type electron source.

FIG. 15 is a schematic perspective view of the display panel of an image-forming apparatus incorporating an electron source having a ladder-like arrangement of electron-emitting devices.

In FIG. 15, the display panel comprises grid electrodes 302, each provided with a number of bores 303 for allowing electrons to pass therethrough and a set of external terminals D1 through Dm, along with another set of external terminals G1 through Gn, which are connected to the respective grid electrodes 302. Note that the common wires 304 are integrally formed on the substrate 1.

Note that, in FIG. 15, the components that are similar to those of FIG. 11 are respectively denoted by the same reference symbols. The image forming apparatus differs from the image forming apparatus with a simple matrix arrangement of FIG. 11 mainly in that the apparatus of FIG. 15 has grid electrodes 302 arranged between the electron source substrate 1 and the face plate 116.

In FIG. 15, the stripe-shaped grid electrodes 302 are arranged between the substrate 1 and the face plate 116. The grid electrodes 302 can modulate electron beams emitted from the surface conduction electron-emitting devices 104, each provided with through bores 303 in correspondence to respective surface conduction electron-emitting devices 104 for allowing electron beams to pass therethrough.

Note that, however, while stripe-shaped grid electrodes are shown in FIG. 15, the profile and the locations of the electrodes are not limited thereto. For example, the bores 303 may be replaced by mesh-like openings and the grid electrodes 302 may be arranged around or close to the surface conduction electron-emitting devices 104.

The external terminals D1 through Dm and G1 through Gn are connected to a drive circuit (not shown). An image-forming apparatus having a configuration as described above can be operated for electron beam irradiation by simultaneously applying modulation signals to the rows of grid electrodes 302 for a single line of an image in synchronism with the operation of driving (scanning) the electron-emitting devices on a row by row basis so that the image can be displayed on a line by line basis as electron beams are irradiated to the fluorescent film 114 in a controlled manner.

Thus, a display apparatus according to the invention and having a configuration as described above can have a wide variety of industrial and commercial applications because it can operate as a display apparatus for television broadcasting, as a terminal apparatus for video teleconferencing, as an editing apparatus for still and movie pictures, as a terminal apparatus for a computer system, as an optical printer comprising a photosensitive drum and in many other ways.

With a method of manufacturing an image-forming apparatus according to the invention, the electroconductive thin film can be formed without showing the phenomenon of aggregation or sublimation so that all the surface conduction electron-emitting device can operate uniformly without any undesired unevenness of operation. Thus, an image-forming apparatus that can display clear images can be obtained.

EXAMPLES

Now, the present invention will be described by way of examples.

Example 1

An organometallic complex of palladium acetate (hereinafter referred to as PA) with methyldipropylamine (hereinafter referred to as MDPA) was synthetically prepared in the following manner for electroconductive thin film.

A 10 g of PA was dissolved into a 200 cm$^3$ of chloroform and a 12.8 g of MDPA was slowly added thereto. Then, the solution was stirred for 2 hours at room temperature. After the completion of the reaction in the solution, the raw materials were removed by means of a silica gel column to obtain a 500 cm$^3$ of PA-MDPA/chloroform solution. The solution was then condensed to 100 cm$^3$ and washed with a 50 cm$^3$ of water for three times. Then, it was dried with magnesium sulfate and, after drying, the chloroform was removed to produce a 16.4 g of PA-MDPA.

Thereafter, a 0.4M of PA-MDPA/butylacetate solution was prepared and used as the material of electroconductive thin film.

Examples 2 through 6

Organic metal complexes were prepared as in the case of Example 1 and dissolved into respective organic solvents to produce 0.4Ms of materials for forming an electroconductive thin film as listed below.

Example 7

An organometallic complex of palladium propionate (hereinafter referred to as PP) with DDA was synthetically prepared in the following manner for electroconductive thin film.

A 15.0 g of propionic acid was added to a 12.7 g of PA and heated to 80° C. for 3 hours for reaction. After cooling, the reaction product was dissolved into chloroform and refined in a silica gel column to produce a 12.7 g of PP after removing the chloroform.

Thereafter, a 10.1 g of PP was dissolved into a 200 cm$^3$ of chloroform and a 35.7 g of DDA was slowly added thereto. Then, the solution was stirred at room temperature for 2 hours. After the completion of the reaction in the solution, the raw materials were removed by means of a silica gel column to obtain a 500 cm$^3$ of PP-DDA/chloroform solution. The solution was then condensed to 100 cm$^3$ and washed with a 50 cm$^3$ of water for three times. Then, it was dried with magnesium sulfate and, after drying, the chloroform was removed to produce a 28.7 g of PP-DDA.

Thereafter, a 0.4M of PP-DDA/chloroform solution was prepared and used as the material of electroconductive thin film.

Examples 8 through 11

The following metal complexes and carboxylic acids were used as starting materials for ligand-exchange reactions of the metal complexes and then made to react with amines to produce organometallic complexes, from which 0.4Ms of

| Example | metal complex | amine | material |
|---|---|---|---|
| 2 | copper acetate | methyldibutylamine | copper acetate-methyldibutylamine/ $CH_3COOC_2H_5$ (hereinafter referred to as CA-MDBA/$CH_3COOC_2H_5$ |
| 3 | palladium acetate | methyloctadecylamine | paliadium acetate-methyloctadecylamine (hereinafter referred to as PA-MDODA/$CHCl_3$) |
| 4 | palladium acetate | didecylamine | palladium acetate-didecylamine (hereinafter referred to as PA-DDA/$CHCl_3$) |
| 5 | silver acetate | ethyldihexadecylamine | silver acetate-ethyldihexadecylamine (hereinafter referred to as SA-EDHA/$CH_3COOC_2H_5$) |
| 6 | ruthenium acetate | didecylamine | ruthenium acetate-didecylamine (hereinafter referred to as EA-DDA/$CHCl_3$) | organometallic complexes/chloroform solution were respectively as materials for forming an electroconductive thin film.

| Example | metal complex | carboxylic acid | amine | material |
|---|---|---|---|---|
| 8 | chromium acetate | stearic acid | DDA | chromium stearate-DDA/$CHCL_3$ (hereinafter referred to as ChST-DDA) |
| 9 | palladium acetate | palmitic acid | stearylamine | palldium palmitate-stearylamine/ $CHCl_3$ (hereinafter referred to as PP1-STA) |
| 10 | terbium acetate | pentadecanoic acid | decylamine | terbium pentadecanate-decylamine/ $CHCl_3$ (hereinafter referred to as TPD-DA) |

| Example | metal complex | carboxylic acid | amine | material |
|---|---|---|---|---|
| 11 | iron acetate | oleic acid | DDA | iron oleate-DDA/CHCl$_3$ (hereinafter referred to as FO-DDA) |

Example 12

The 0.4M-butylacetate solution (0.4M-PA-MDPA/mutylacetate) prepared in Example 1 as a material of electroconductive thin film was applied onto a glass substrate by spin coating to see that it can be used to as a material for forming an electroconductive thin film according to the invention. This will be described in greater detail below.

A film is formed by applying an alkylamine complex of acid-palladium salt expressed by formula (8) below on to a glass substrate (25 mm×38 mm) by means of a rotary application technique.

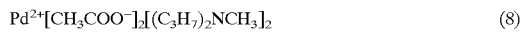

$$Pd^{2+}[CH_3COO^-]_2[(C_3H_7)_2NCH_3]_2 \quad (8)$$

The solution used here was prepared by dissolving the alkylamine complex of acid-palladium salt expressed by formula (8) above into butylacetate to a concentration of 0.4 mol/L and the rotary spinning operation was conducted at a rate of 1,000 rpm for 30 seconds.

The prepared specimen was subsequently irradiated with ultraviolet rays for 2 hours in an O$_3$ atmosphere by means of a commercially available UV/O$_3$ ashing device (UV-300: available from Samco International). The substrate was not heated during the ultraviolet ray irradiation and the oxygen flow rate was 0.5 L/min and then O$_3$ was produced. At this time of operation, the electric resistance of the film per unit surface area was determined by the four-terminal method to find that it was not lower than 10$^9$Ω/cm$^2$.

Thereafter, the specimen was heat treated in an electric furnace whose temperature was controlled to 300° C. (in the atmosphere) for 12 minutes to produce a palladium oxide (PdO) film. The obtained PdO was identified by means of X-ray diffractometry (hereinafter referred to XD technique), where the existence of a peak (2.647 Å) that corresponds to the lattice plane (101) interval was confirmed. The electric resistance of the palladium oxide film per unit surface area was 3×10$^4$Ω/cm$^2$. No unevenness was found on the formed palladium oxide film (dark brown) by visual observation.

Comparative Example 1

A specimen was prepared exactly as in the case of Example 12 except that the UV/O$_3$ process omitted. Slight unevenness was found by visual observation and the average film thickness was smaller than that of Example 1 by about 30%.

Examples 13 through 15

As in the case of Example 12, the materials listed below of electroconductive thin film were applied on glass substrates by spin coating to find that they could be used for forming an electroconductive thin film.

| Example | material of electroconductive thin film | electric resistance of oxide film /Ωcm$^{-2}$ | XD peak /Å |
|---|---|---|---|
| 13 | 0.4M-RA-DDA/CHCl$_3$ | 4.2 × 10$^4$ | 3.182 (110) |
| 14 | 0.4M-ChST-DDA/CHCl$_3$ | 4.6 × 10$^4$ | 2.664 (104) |
| 15 | 0.4M-TPD-DA/CHCl$_3$ | 3.4 × 10$^4$ | 3.101 (222) |

Example 16

A film made of PA-MDODA prepared in Example 3 was formed on a glass substrate and subjected to UV/O$_3$ and other processes to find out that it can be used as material of electroconductive thin film. The method of preparing the film was as follows.

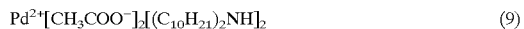

$$Pd^{2+}[CH_3COO^-]_2[(C_{10}H_{21})_2NH]_2 \quad (9)$$

A chloroform solution (0.4 mol/L) of PA-MDODA of formula (9) was added to pure water at 20° C. and the surface pressure was raised to 20 mN/m to form a monomolecular film of PA-MDODA on the pure water. While maintaining the surface pressure, the surface was exposed to a hexamethyldisilazane atmosphere to make the surface hydrophobic. Then, the glass substrate was immersed along a direction that crosses the monomolecular film at a rate of 3 mm/min. and pulled up at the same rate to form two LB film layers of PA-MDODA on the glass substrate. The immersion/pulling up cycle was repeated to produce 80 LB film layers of PA-MDODA.

Then, the specimen was subjected to a UV/O$_3$ process under the conditions of Example 12 and baked to produce a palladium oxide film. The palladium oxide film was identified by means of the XD technique as in the case of Example 12. The electric resistance by unit surface area was 4×10$^4$Ω/cm$^2$.

Examples 17 through 19

As in the case of Example 16, the materials listed below of electroconductive thin film were prepared by the LB technique to find that they could be used for forming an electroconductive thin film.

| Example | material of electroconductive thin film | electric resistance of oxide film /Ωcm$^{-2}$ | XD peak /Å |
|---|---|---|---|
| 17 | 0.4M-RA-DDA/CHCl$_3$ | 3.7 × 10$^4$ | 3.181 (110) |
| 18 | 0.4M-ChST-DDA/CHCl$_3$ | 4.3 × 10$^4$ | 2.663 (104) |
| 19 | 0.4M-TPD-DA/CHCl$_3$ | 3.2 × 10$^4$ | 3.101 (222) |

Example 20

An LB film made of a mixture of an alkylamine complex of acid-palladium salt expressed by formula (10) below (hereinafter referred to as PA-DDA) prepared in Example 4 and docosanoic acid (hereinafter referred to as C$_{22}$) was formed on a silicon wafer with a diameter of 1 inch and then turned into an oxide film. The film was prepared in the following manner.

$$Pd^{2+}[CH_3COO^-]_2[(C_{10}H_{21})_2NH]_2 \quad (10)$$

A chloroform solution (0.5 mol/L) of PA-DDA and a chloroform solution (0.5 mol/L) of $C_{22}$ were mixed to a voluminal ratio of 1:4 and the mixture solution was added to the surface of pure water at 20° C. Then, the surface pressure was raised to 20 mN/m to form a monomolecular film of a mixture of PA-DDA and $C_{22}$ (=1:4) on the pure water. While maintaining the surface pressure, the natural oxide surface layer was removed in advance by means of a 1% solution of hydrogen fluoride to make the surface hydrophobic. Then, the silicon wafer was immersed along a direction that crosses the monomolecular film at a rate of 2 mm/min. and pulled up at the same rate to form two LB film layers of the mixture of PA-DDA and $C_{22}$ (=1:4) on the silicon wafer. The immersion/pulling up cycle was repeated to produce 200 LB film layers of the mixture of PA-DDA and $C_{22}$ (=1:4). A total of six specimens were prepared. Then, the specimens ware tested for FT-IR spectra.

Then, as in the case of Example 12, the prepared specimens were irradiated with ultraviolet rays for 0 (or unirradiated), 0.5, 1, 1.5, 2 and 3 hours respectively in an $O_3$ atmosphere by means of a commercially available $UV/O_3$ ashing device (UV-300: available from Samco International). The substrate were not heated during the ultraviolet ray irradiation and the oxygen flow rate was 0.5 L/min.

The specimens were tested again for FT-IR spectra to find that the absorption peak intensities attributable to the organic moieties had been reduced from the respective levels before the UV irradiation for each specimen. More specifically, the absorption peak intensities attributable to the oscillation of $CH_2$ for 2,918 $cm^{-1}$, 2,851 $cm^{-1}$, 1,474 $cm^{-1}$ and 721 $cm^{-1}$ were found to have been reduced from the level before the test by about 65% for the 0.5 hour irradiation, about 25% for the 1.0 hour irradiation, about 3% for the 1.5 hours irradiation and less than 1% for the 2 and 3 hours irradiations. At this time of operation, the electric resistance of the film per unit surface area was determined for each specimen to find that it was not lower than $10^9\Omega/CM^2$.

Subsequently, the specimens were heat treated in an electric furnace (300° C. for 12 minutes in the atmosphere) to find that the unirradiated specimen and the specimen with the 0.5 hour irradiation had been spotted and their film coatings had been destroyed to some extent. The specimen with the 1 hour irradiation carried uneven portions particularly along the edges presumably caused by aggregation and fusion. No such symptoms of aggregation and fusion were observed on the remaining specimens.

At this stage, the electric resistance of the palladium oxide film per unit surface area was $2\times10^4\Omega/cm^2$ for all the specimens. Absorption peak intensities (590 $cm^{-1}$ and others) were observed in the FT-IR spectra of the specimens.

Examples 21 through 23

As in the case of Example 20, the materials listed below of electroconductive thin film were prepared on respective silicon wafers having a diameter of 1 inch by the LB technique and then turned into oxide films to find that they could be used for forming an electroconductive thin film. The film was prepared in the following manner.

| Example | material of electro-conductive thin film | electric resistance of oxide film /$\Omega cm^{-2}$ |
|---|---|---|
| 21 | 0.5M-RA-DDA/$CHCl_3$ + 0.5M-oleic acid | $4.1 \times 10^4$ |
| 22 | 0.4M-FO-DDA/$CHCl_3$ + 0.5M-DDA | $5.5 \times 10^4$ |
| 23 | 0.4M-PPA-STA/$CHCl_3$ + 0.5M-pentadecaic acid | $3.2 \times 10^4$ |

Example 24

The number of LB film forming cycle of Example 20 was altered for this example. The specimens of this examples were prepared in the following manner.

The specimens were prepared exactly as that of Example 20 except that 100, 150, 250 and 500 LB film layers were formed on the substrates 20 and glass substrates (25 mm×38 mm) were treated by hexamethyldisilazane to make them hydrophobic. The electric resistances by unit surface of the specimens were $1.0\times10^5\Omega/cm^2$, $3.1\times10^4\Omega/cm^2$, $1.6\times10^4\Omega/cm^2$ and $3.9\times10^3\Omega/cm^2$ respectively.

Example 25

The process of $UV/O_3$ irradiation of Example 20 was altered for this example. The specimen of this example was prepared exactly as that of Example 20 except that the process of $UV/O_3$ irradiation was carried out in the atmosphere. The $UV/O_3$ irradiation process of this example will be described below.

UV rays were irradiated by means of a 200 W low voltage mercury lamp capable of irradiating ultraviolet rays with wavelengths of 197 nm and 248 nm in the atmosphere for continuously 48 hours. The mercury lamp and the specimen was separated from each other by 10 cm.

At this stage, the electric resistance of the specimen per unit surface area was greater than $10^9\Omega/cm^2$. After a baking process as in the case of Example 20, the electric resistance per unit surface area fell to $2\times10^4\Omega/cm^2$.

Example 26

A substrate having a size different from that of Example 20 was used for this example. The specimen of this example was prepared exactly as that of Example 20 except that a glass substrate with a diameter of 5 inch was used for this example. The electric resistance of the specimen per unit surface area was determined at different positions shown in FIG. 1 and the values as listed in the table below were obtained.

| position | resistance per unit area ($\times 10^{-4}\Omega/cm^2$) | position | resistance per unit area ($\times 10^{-4}\Omega/cm^2$) |
|---|---|---|---|
| x5 | 1.96 | y5 | 2.02 |
| x4 | 1.97 | y4 | 1.95 |
| x3 | 1.95 | y3 | 1.96 |
| x2 | 1.94 | y2 | 1.95 |
| x1 | 1.96 | y1 | 1.96 |
| 0 | 1.96 | | |
| −x1 | 1.95 | −y1 | 1.94 |
| −x2 | 1.95 | −y2 | 1.94 |
| −x3 | 1.96 | −y3 | 1.95 |
| −x4 | 1.95 | −y4 | 1.94 |
| −x5 | 1.94 | −y5 | 1.92 |

The above table shows that the films were highly uniform along the intraplanar directions.

Example 27

An LB film was formed on a glass substrate for this example as in the case of Example in a manner as described below.

An LB film of a mixture of an alkylamine complex of acid-palladium salt expressed by formula (11) (hereinafter referred to as PA-OA) and poly(isobutyl methacrylate) was formed on a glass substrate (25 mm×38 mm) that had been treated with hexamethyldisilazane (hereinafter referred to as PIBM) for hydrophobicity.

$$Pd^{2+}[CH_3COO^-]_2[(C_8H_{17})_2NH]_2 \quad (11)$$

A chloroform solution of PA-OA (0.5 mol/L) and a chloroform solution of PIBM (0.5 mol/L in terms of monomer) were mixed to a voluminal ratio of 1:2 and the mixed solution was spread on pure water at 20° C. Subsequently, the surface pressure was raised to 10 mN/m to form a monomolecular film of the 1:2 mixture of PD-OA and PIBM. While maintaining the surface pressure, the glass substrate that had been treated for hydrophobicity with hexamethyldisilazane was immersed along a direction that crosses the monomolecular film at a rate of 2 mm/sec. and pulled up at the same rate to form two LB film layers of the mixture of PA-OA and PIBM (=1:2) on the glass substrate. The immersion/pulling up cycle was repeated to produce 200 LB film layers of the mixture of PA-OA and PIBM (=1:2).

The prepared specimen was subsequently irradiated with ultraviolet rays for 2 hours in an $O_3$ atmosphere by means of a commercially available UV/$O_3$ ashing device. The substrate was not heated during the ultraviolet ray irradiation and the oxygen flow rate was 0.5 L/min. At this stage of operation, the electric resistance of the film per unit surface area was determined by the four-terminal method to find that it was not lower than $10^9\Omega/cm^2$.

Thereafter, the specimen was exactly as in the case of Example 12 (at 300° C. for 12 minutes in the atmosphere) to produce a palladium oxide (PdO) film. The electric resistance of the palladium oxide film per unit surface area was $2\times10^4\Omega/cm^2$.

Example 28

The specimens of this examples were prepared exactly as in the case of Example 20 except that the heat treatment was conducted in a nitrogen atmosphere in place of in the air.

The specimen untreated with UV/$O_3$ and the specimen exposed to UV/$O_3$ for 0.5 hour were found to have been spotted and their film coatings had been destroyed to some extent. The specimen with the 1 hour UV/$O_3$ exposure carried uneven portions particularly along the edges presumably caused by aggregation and fusion. No such symptoms of aggregation and fusion were observed on the remaining specimens (with 1.5 hours or more UV/$O_3$ irradiation) so that they carried a uniform film.

All the specimens with 1.5 hours or more UV/$O_3$ exposure showed an electric resistance per unit surface area not higher than $2\times10^3\Omega/cm^2$. Pd was identified by means of the XD technique to find a peak (2.39 Å) corresponding to the plane interval of the lattice plane (110) of PdO.

Example 29

A DMAc solution of methyl ester of polyamic acid expressed by formula (12) below (concentration: 2 mmol/L in terms of monomer) and a chloroform solution of palladium acetate (concentration: 40 mmol/L) were mixted to a ratio of 20:1 (v/v) (a mixture prepared in this manner is referred to as mixture I hereinafter)

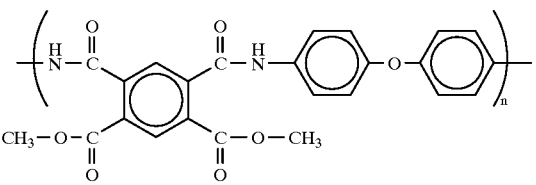

(12)

A film of the mixture I was formed on a silicon wafer with a diameter of 1 inch by means of rotary application at a rate of 1,000 rpm for 30 seconds.

The specimen was subsequently heated in an electric furnace at 150° C. for 30 minutes and then at 300° C. for another 30 minutes. It was confirmed by an IR spectrum that the specimen was made of polyimide and palladium oxide.

The electroconductivity of the specimen was found to be $1\times10^{-9}$S/cm. Meanwhile, the electroconductivity of the polyimide (formula (13)) prepared from methyl ester of polyamic acid (formula (12)) was $1\times10^{-13}$S/cm.

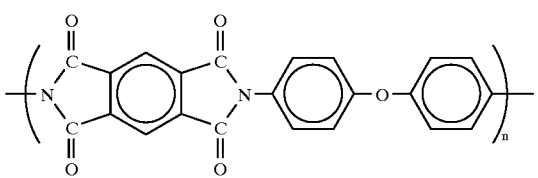

(13)

Example 30

A DMAC solution of octadecyl ester of polyamic acid expressed by formula (14) below (concentration: 2 mmol/L in terms of monomer) and a chloroform solution of palladium acetate (concentration: 40 mmol/L) were mixed to a ratio of 20:1 (v/v) (a mixture prepared in this manner is referred to as mixture II hereinafter).

(14)

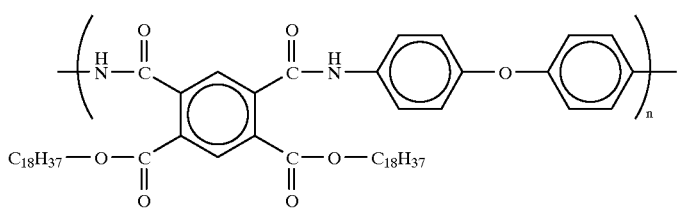

A film of the mixture II was formed on a silicon wafer with a diameter of 1 inch by means of the LB technique as will be described below.

A DMAc-chloroform mixed solution (20:1) of the mixture II was extended on the surface of pure water at 20° C. and the surface pressure was raised to 20 mN/m to form a monomolecular film of the mixture II on the pure water. While maintaining the surface pressure, a silicon wafer (diameter: 1 inch) whose natural oxide surface layer had been removed by means of hydrogen fluoride was immersed along a direction that crosses the monomolecular film at a rate of 6 mm/min. and pulled up at the same rate to form two LB film layers of the mixture II on the silicon wafer. The immersion/pulling up cycle was repeated to produce 20 LB film layers of the mixture II.

Then, the specimen was heated in an electric furnace under reduced pressure at 300° C. for 30 minutes. Thereafter, the pressure was raised to the atmospheric pressure (replacing with air) and the specimen was heated at 350° C. for 15 minutes. It was confirmed by an IR spectrum that the specimen was made of polyimide and palladium oxide. The electroconductivity of the specimen was found to be $7\times10^{-8}$ S/cm.

Example 31

An LB film of the mixture II comprising 20 layers was prepared exactly as in the case of Example 30 and the specimen was heated in a nitrogen atmosphere at 300° C. for 30 minutes. It was confirmed by an IR spectrum that the specimen was made of polyimide and palladium oxide. The electroconductivity of the specimen was found to be $5\times10^{-7}$ S/cm.

Example 32

An LB film of the mixture II comprising 20 layers was prepared on a silicon wafer exactly as in the case of Example 30.

The specimen was then immersed in a mixed solvent of pyridine, acetic acid anhydride and benzene (1:1:10 in voluminal ratio) for 12 hours for imidization and elimination of ligands from the palladium compound. It was confirmed by an IR spectrum that the specimen was made of polyimide and palladium oxide. The electroconductivity of the specimen was found to be $6\times10^{-7}$ S/cm.

Example 33

A DMAC solution of methyl ester of polyamic acid expressed by formula (12) (concentration: 2 mmol/L in terms of monomer) and a chloroform solution of (dodecylamine)palladium acetate (concentration: 40 mmol/L) were mixed to a ratio of 20:1 (v/v) (a mixture prepared in this manner is referred to as mixture III hereinafter).

A film of the mixture III was formed on a silicon wafer with a diameter of 1 inch by means of the LB technique as will be described below.

A DMAc-chloroform mixed solution (20:1) of the mixture III was extended on the surface of pure water at 20° C. and the surface pressure was raised to 20 mN/m to form a monomolecular film of the mixture III on the pure water. While maintaining the surface pressure, a silicon wafer (diameter: 1 inch) whose natural oxide surface layer had been removed by means of hydrogen fluoride was immersed along a direction that crosses the monomolecular film at a rate of 10 mm/min. and pulled up at the same rate to form two LB film layers of the mixture III on the silicon wafer. The immersion/pulling up cycle was repeated to produce 20 LB film layers of the mixture III.

Then, the specimen was heated in an electric furnace under reduced pressure at 300° C. for 30 minutes. Thereafter, the pressure was raised to the atmospheric pressure (replacing with air) and the specimen was heated at 350° C. for 15 minutes. It was confirmed by an IR spectrum that the specimen was made of polyimide and palladium oxide. The electroconductivity of the specimen was found to be $8\times10^{-8}$ S/cm.

Example 34

A liquid crystal alignment film was prepared in a manner as described below.

As shown in FIG. 2, ITO was deposited to a thickness of 120 nm on a pair of glass substrate 1 for transparent electrodes 2 by reactive sputtering and the deposits were washed and exposed to hexamethyldisilazane vapor to make the surface hydrophobic.

Then, a DMAc solution of methyl ester of polyamic acid expressed by formula (15) below (concentration: 2 mmol/L in terms of monomer) and a chloroform solution of palladium acetate (concentration: 40 mmol/L) were mixed to a ratio of 20:1 (v/v) (a mixture prepared in this manner is referred to as mixture IV hereinafter).

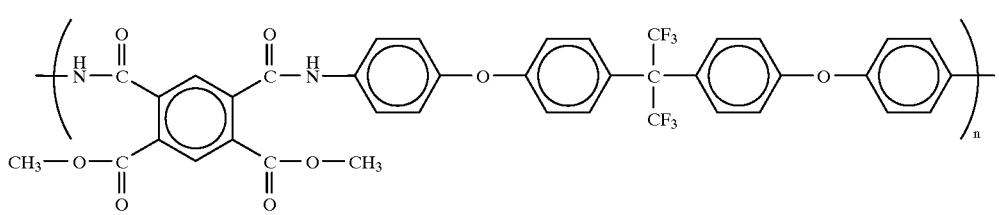

(15)

A film of the mixture IV was formed on a silicon wafer with a diameter of 1 inch by means of spin coating at a rate of 2,700 rpm for 20 seconds. The formed film was 3 nm thick.

Figure 3:
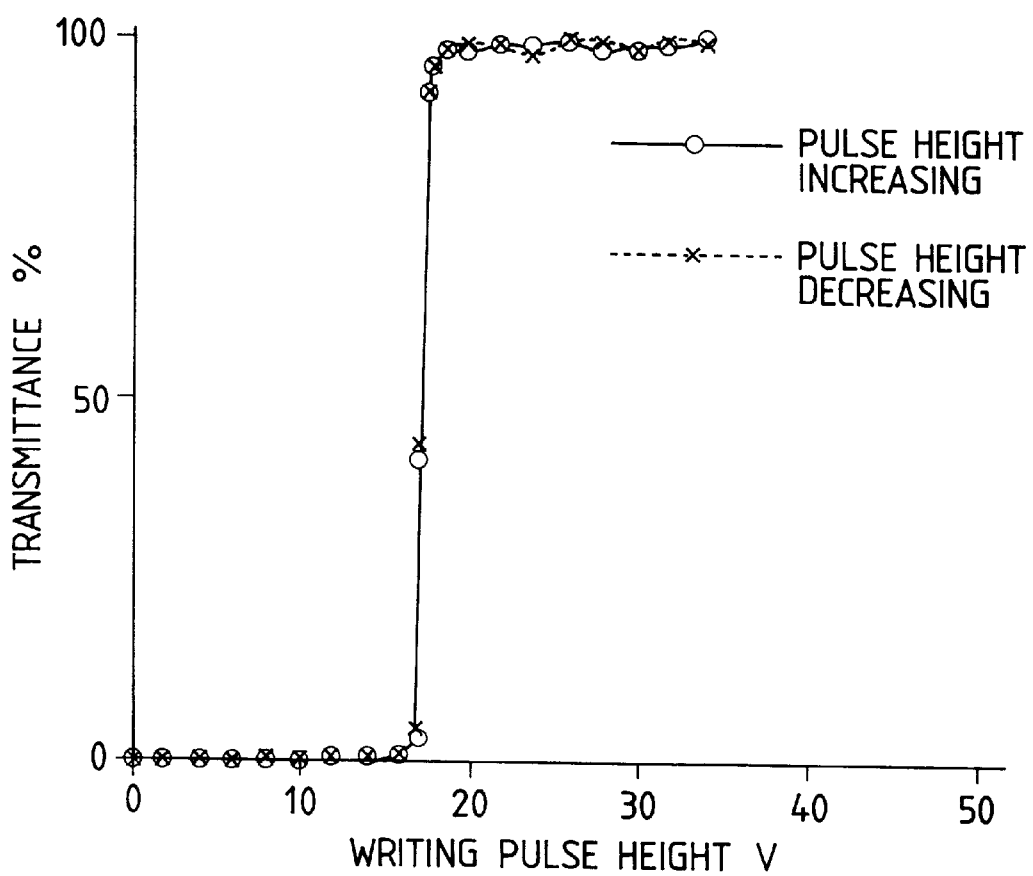
FIG. 3 is a graph showing the relationship between the voltage applied to a liquid crystal device according to the invention and the transmittance of the device.

The obtained specimen was heated at 300° C. for 30 minutes in an electric furnace having a nitrogen atmosphere to produce a liquid crystal alignment film 3 of polyimide expressed by formula (16) below and palladium. The surface of the liquid crystal alignment film (3) was subjected to a rubbing process (depression: 0.4 mm, 1,000 rpm, speed 12 mm/sec.).

from FIG. 3, the hysteresis loop of the rising and falling wave height of the writing pulse voltage was very little to prove that the liquid crystal device can be finely controlled for tone.

The delay (of optical response) after the application of a writing pulse voltage was less than 0.1 sec. and the phenomenon of afterimage was not remarkable.

While palladium was used in this example, the metal that can be used for the purpose of the present invention is not limited thereto and may be selected from Ru, Ag, Cu, Cr, Tb, Cd, Fe and Zn. Likewise, liquid crystal devices other than

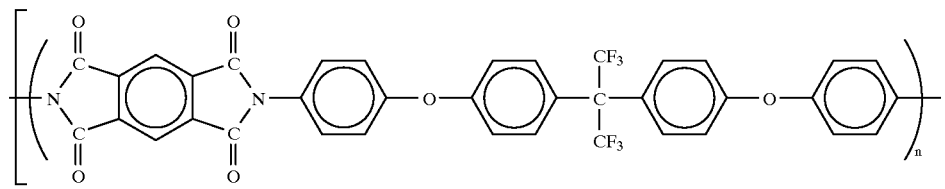

(16)

Alumina beads having an average particle size of 1.5 μm were sprayed on one of the substrate as spacers 4 and then the substrates were put together to form a liquid crystal cell such that the rubbing directions of the substrates are oppositely arranged in parallel with each other and show a degree of 10° relative to the intraplanar direction (cross rubbing).

A blend of ferroelectric liquid crystal 5 containing as a principal ingredient ferroelectric smectic liquid crystal CS-1014 (trade name: available from Chisso Co., Ltd) in the isotropic phase was injected into the evacuated cell and then cooled gradually at a rate of 0.5° C./hour to produce a liquid crystal device having a configuration as shown in FIG. 2.

The liquid crystal device was pinched by a pair of Cross Nicol polarizers and tested for its performance by applying various different voltages and observing the intensity of transmitted light. Firstly, a resetting pulse voltage having a pulse width of 100 μsec., a wave height of −20 V was applied to turn the entire device surface dark (a state referred to as 0% transmissivity) and then a writing pulse voltage having a pulse width of 20 μsec. was applied. After the application of the writing pulse voltage, a transmissivity of 26.7 msec. was observed.

Then, the wave height of the writing pulse voltage was gradually raised until the entire device surface turned white (a state referred to as 100% transmissivity) to obtain a relationship between the wave height of the writing pulse voltage and the transmissivity (V-T characteristic) as shown in FIG. 3 (with o and solid line). Subsequently, the wave height of the writing pulse voltage was gradually lowered until the entire device surface turned dark to obtain a relationship as also shown in FIG. 3 (with x). As clearly seen ferroelectric liquid crystal devices such as TN and STN devices may also be used for the purpose of the invention. The method of forming a liquid crystal alignment layer is not limited to the one used in this example and the LB method may alternatively be used.

Example 35

A surface conduction electron-emitting device having a configuration as shown in FIGS. 4A and 4B was prepared in a manner as described below.

A quartz substrate was used for the insulated substrate 1 of the specimen. After thoroughly cleansing it with an organic solvent, a pair of Pt electrodes 4, 5 were formed. The device electrodes were separated by a distance L of 3 μm and had a width W of 500 μm and a thickness d of 300 Å.

Thereafter, 80 layers of PA-DDA/CHCl$_3$ prepared in Example 4 were formed as an electroconductive thin film 3 on the entire substrate carrying the device electrodes. After irradiating the substrate with UV/O$_3$ for 30 minutes, heating the substrate to 80° C., a film of palladium oxide (PdO) fine particles (with an average particle size of 60 Å) was formed on the substrate by baking it at 300° C. for 10 minutes in a clean oven under the atmospheric pressure. The film of fine particles had a film thickness of 0.02 μm and an electric resistance per unit surface area of 2×10$^4$Ω/□.

A cover with dimensions of 300 μm×200 μm was formed on an intended surface area of the thin film by applying an OMR resist and thereafter subjecting it to an Ar gas dry etching operation to remove the PdO fine particles of the remaining area. Then, the resist was removed by an UV/O$_3$ asher to produce an electroconductive thin film 3.

Subsequently, a voltage was applied to the device electrodes 4, 5 in an electric forming process the device to produce an electron emitting region 2 in the electroconductive film. FIG. 7A shows the voltage waveform used for the electric energization forming process. In FIG. 7A, T1 and T2 respectively denote the pulse width and the pulse interval of the applied pulse voltage, which were respectively 1 millisecond and 10 milliseconds for this example. The wave height (the peak voltage for the forming operation) of the applied pulse voltage was 5 V and the forming operation lasted about 60 seconds at $10^{-6}$ torr.

With the above described arrangement, the specimen of electron-emitting device was observed for electron-emitting performance in a gauging system as shown in FIG. 8. In the above observation, the distance H between the anode and the electron-emitting device was 4 mm and the potential of the anode 54 was 1 kV, while the degree of vacuum in the vacuum chamber of the system was held to $1 \times 10^{-6}$ torr throughout the gauging operation. The emission current Ie began to rapidly increase when the device voltage Vf became as high as 8 V and a device current Ie of 2.0 mA and an emission current of 1.0 $\mu$A were observed when the device voltage rose to 14 V to prove an electron-emitting efficiency of $\eta = Ie/If(\%) = 0.05\%$.

Example 36

In this example, an image-forming apparatus was prepared by incorporating an electron source realized by using surface conduction electron-emitting devices same as the device of Example 35.

Figure 16:
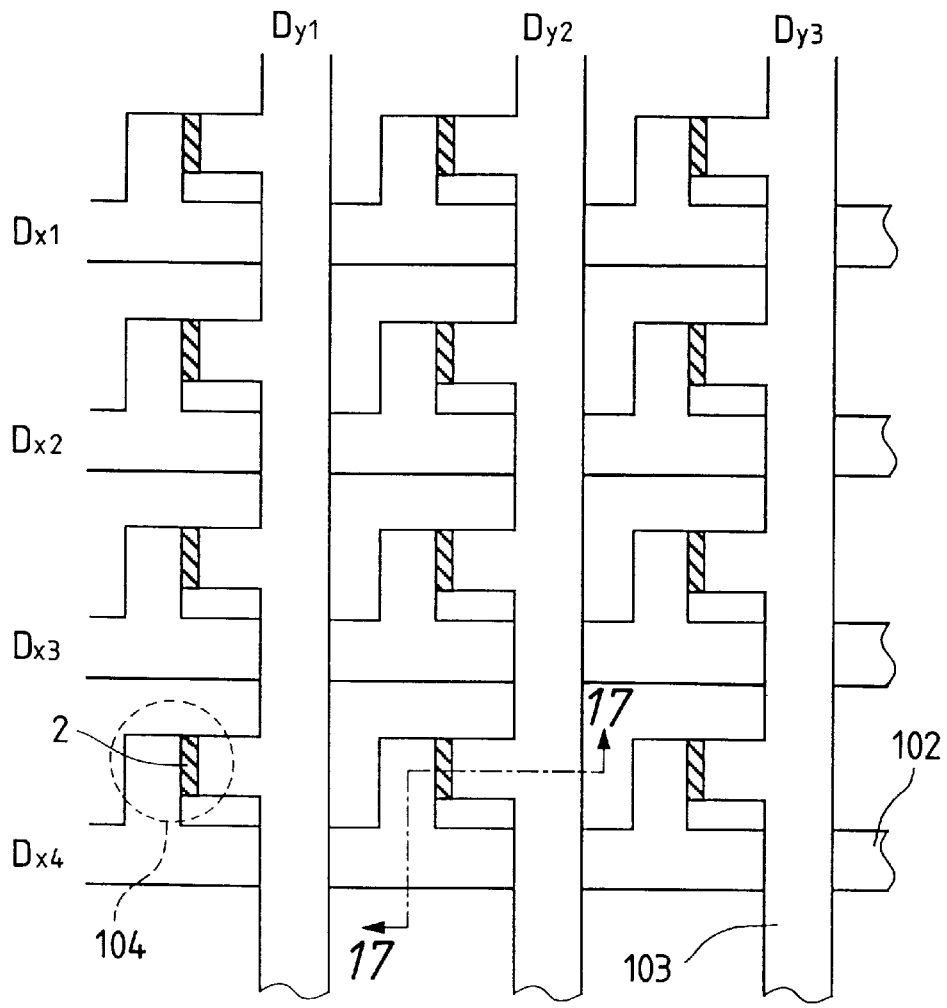
FIG. 16 is an enlarged schematic view of the electron source of FIG. 10.
Figure 17:
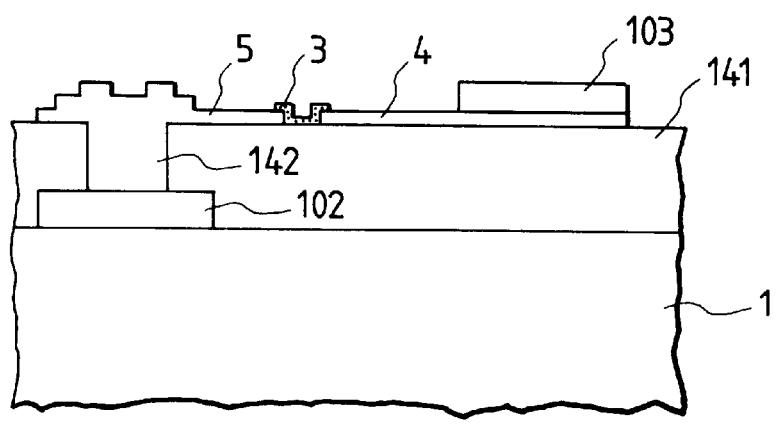
FIG. 17 is a partial sectional view of the electron source of FIG. 16 taken along line 17—17.
Figure 18A:
FIGS. 18A, 18B, 18C, 18D, 18E, 18F, 18G and 18H are schematic views of the electron source of Example 36, showing different manufacturing steps.
Figure 18B:
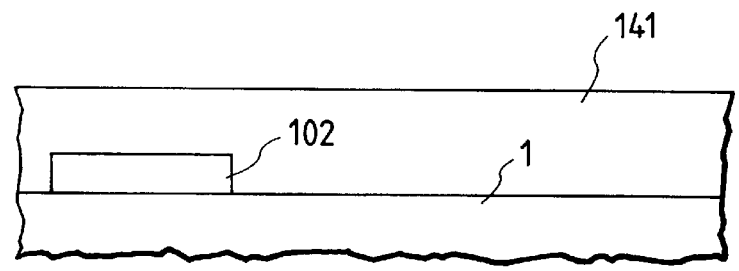
Figure 18C:
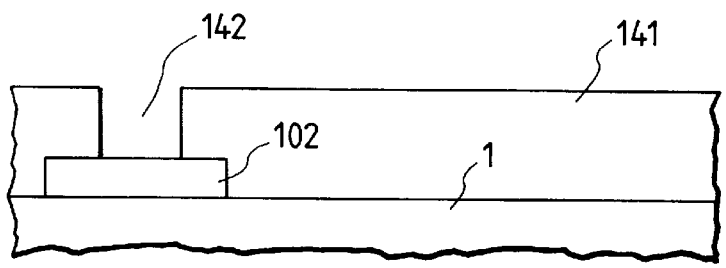
Figure 18D:
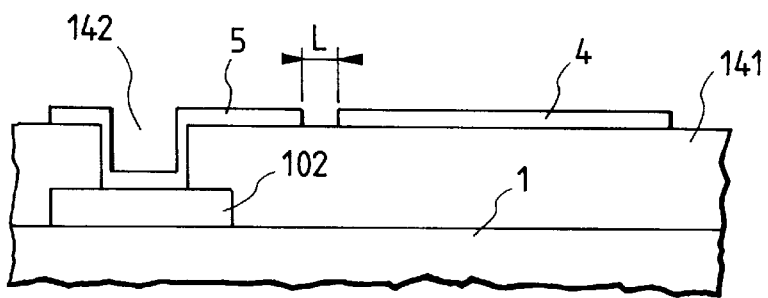
Figure 18E:
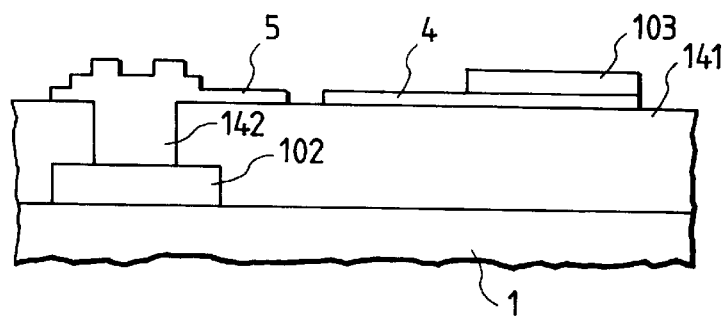
Figure 18F:
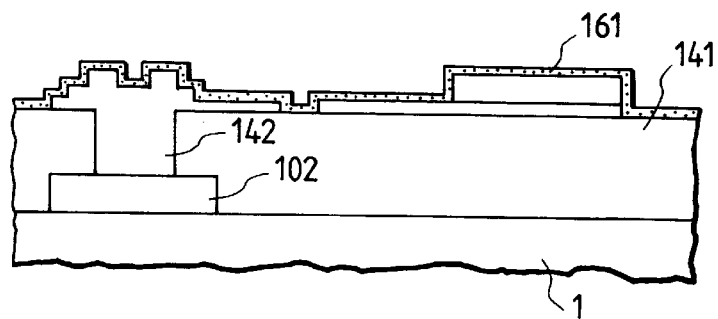
Figure 18G:
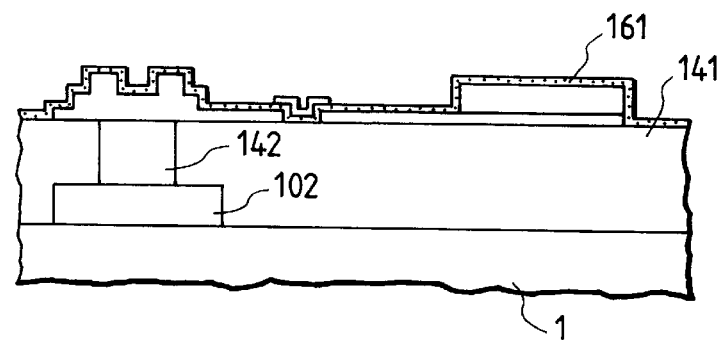
Figure 18H:
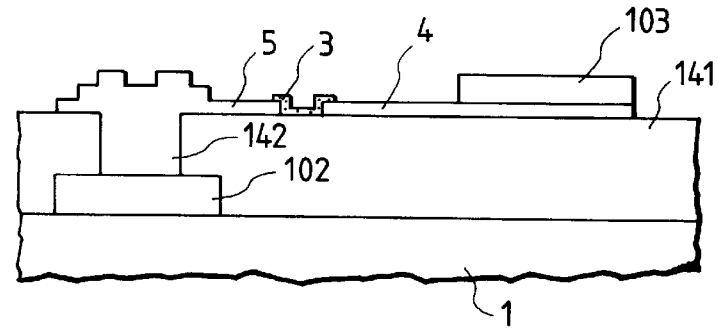

FIG. 16 is a partial plan view of the electron source. FIG. 17 is a partial sectional view taken along line 17—17. The components same as those of FIG. 10 are respectively indicated by the same reference simbols. In FIGS. 16 and 17, reference numeral 141 denotes an interlayer insulation layer and reference numeral 142 denotes a contact hole for electrically conneting a device electrode 5 and a corresponding lower wire (X-directional wire).

Firstly, the steps of preparing the electron source will be described by referring to FIGS. 18A through 18H, which respectively correspond to Steps a through h below.

Step a: After thoroughly cleansing a soda lime glass substrate 1, Cr and Au were sequentially laid to thicknesses of 50 Å and 6,000 Å respectively by vacuum deposition and then a photoresist (AZ1350SF: available from Hoechst Corporation) was formed thereon by rotary application using a spinner and baked. Thereafter, a photomask image was exposed to light and developed to produce a resist pattern for lower wires 102 and then the deposited Au/Cr film was wet-etched to produce lower wires 102 having a desired profile.

Step b: A silicon oxide film was formed as an interlayer insulation layer 141 to a thickness of 0.5 $\mu$m by RF sputtering.

Step c: A photoresist pattern was prepared for producing contact holes 142 in the silicon oxide film deposited in Step b, which contact holes 142 were then actually formed by etching the interlayer insulation layer 141, using the photoresist pattern for a mask. RIE (Reactive Ion Etching) using $CF_4$ and $H_2$ gas was employed for the etching operation.

Step d: Thereafter, a pattern of photoresist (RD-2000N-10: available from Hitachi Chemical Co., Ltd.) was formed for pairs of device electrodes and gaps separating the respective pairs of electrodes and then Ti and Ni were sequentially deposited thereon respectively to thicknesses of 50 Å and 1,000 Å by vacuum deposition. The photoresist pattern was dissolved by an organic solvent and the Ni/Ti deposit film was treated by using a lift-off technique to produce pairs of device electrodes that were separated from each other by a distance (L) of 3 $\mu$m, each having a width of 300 $\mu$m.

Step e: After forming a photoresist pattern on the device electrodes 4, 5 for upper wires (Y-directional wires) 103, Ti and Au were sequentially deposited by vacuum deposition to respective thicknesses of 50 Å and 5,000 Å and then unnecessary areas were removed by means of a lift-off technique to produce upper wires 103 having a desired profile. Subsequently, a pattern for applying resist in areas other than the contact holes 142 was prepared and Ti and Au were sequentially deposited by vacuum deposition to respective thicknesses of 50 Å and 5,000 Å and then unnecessary areas were removed by means of a lift-off technique to fill the contact holes.

Step f: A PdO fine particle film was formed on the entire surface of the substrate with a method described in Example 35.

Step g: A pattern was formed for an electroconductive thin film with OMR resist.

Step h: The areas of the PdO fine particle film 161 not covered by a pattern in Step g were etched out, using Ar gas and then the resist was removed by $UV/O_3$ ashing.

A large number of surface conduction electron-emitting devices were prepared on a same and single substrate in a manner as described above, although they were not subjected to a forming process yet, and the devices were tested for electric resistance to find out that the deviation in the electric resistance of the devices was less than one third of that of comprable devices prepared with a conventional method.

Then, the electron source substrate 1 that had not been subjected to an electric forming process was rigidly fitted to a rear plate 111 and thereafter a face plate 116 (prepared by forming a fluorescent film 114 and a metal back 116 on the inner surface of a glass substrate 113) was arranged 5 mm above the electron source 1 by interposing a support frame 112 therebetween. Frit glass was applied to junction areas of the face plate 116, the support frame 112 and the rear plate 111, which were then baked at 400° C. for 10 minutes in the atmosphere and bonded together to a hermetically sealed condition. The electron source substrate 1 was also firmly bonded to the rear plate 111 by means of frit glass.

Stripe-shaped fluorescent bodies and black stripes made of a popular material containing graphite as a principal ingredient were used for this example. The fluorescent bodies were applied to the glass substrate 113 by means of a slurry technique.

A metal back 115 is normally arranged on the inner surface of the fluorescent film 114. In this example, a metal back was prepared by producing an Al film by vacuum deposition on the inner surface of the fluorescent film 88 that had been subjected to a smoothing process (filming). The face plate 116 may be additionally provided with transparent electrodes arranged close to the outer surface of the fluorescent film 114 in order to improve the conductivity of the fluorescent film 114 no such electrodes were used in this example because the metal back 115 proved to be sufficiently conductive.

The prepared glass container was then evacuated by means of an exhaust pipe (not shown) and an exhaust pump to achieve a sufficient degree of vacuum inside the container. As in the case of Example 35, thereafter, the electroconductive film of each of the electron-emitting devices arranged on the substrate was subjected to an electric forming operation, where a voltage was applied to the device electrodes of the electron-emitting devices by way of the external terminals Dox1 through Doxm and Doy1 through Doyn to produce an electron-emitting region in each electroconductive film.

Then, the exhaust pipe was sealed by heating it with a gas burner to obtain a hermetically sealed envelope 118, which was held to a degree of vacuum of $10^{-7}$ torr.

Finally, a getter operation was carried out in order to maintain a high degree of vacuum in the glass container.

The external terminals Dox1 through Doxm and Doy1 through Doyn and the high voltage terminal Hv of the display panel were connected to respective drive systems to finish the operation of preparing an image-forming apparatus. The finished image-forming apparatus was operated by applying a voltage to each electron-emitting device by way of the external terminals Dox1 through Doxm and Doy1 through Doyn to cause the electron-emitting devices to emit electrons. Meanwhile, a high voltage of greater than several kV was applied to the metal back 115 or the transparent electrodiode (not shown) by way of a high voltage terminal Hv to accelerate electron beams and cause them to collide with the fluorescent film 114, which by turn was energized to emit light to display fine images that were of a good and uniform quality as compared with those of any conventional image-forming apparatuses.

Example 37

Figure 19:
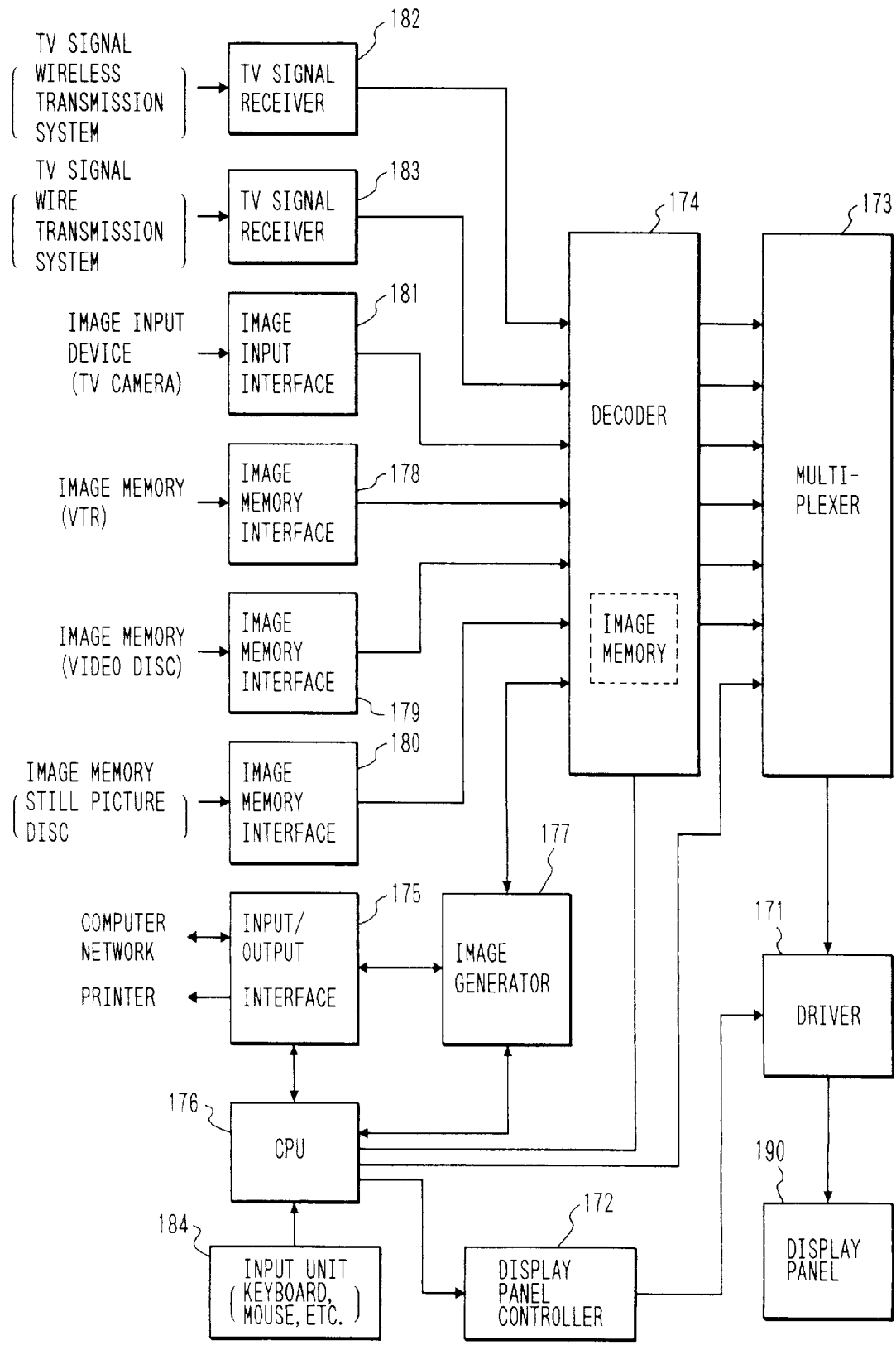
FIG. 19 is a block diagram of the image-forming apparatus of Example 37.
Figure 20:
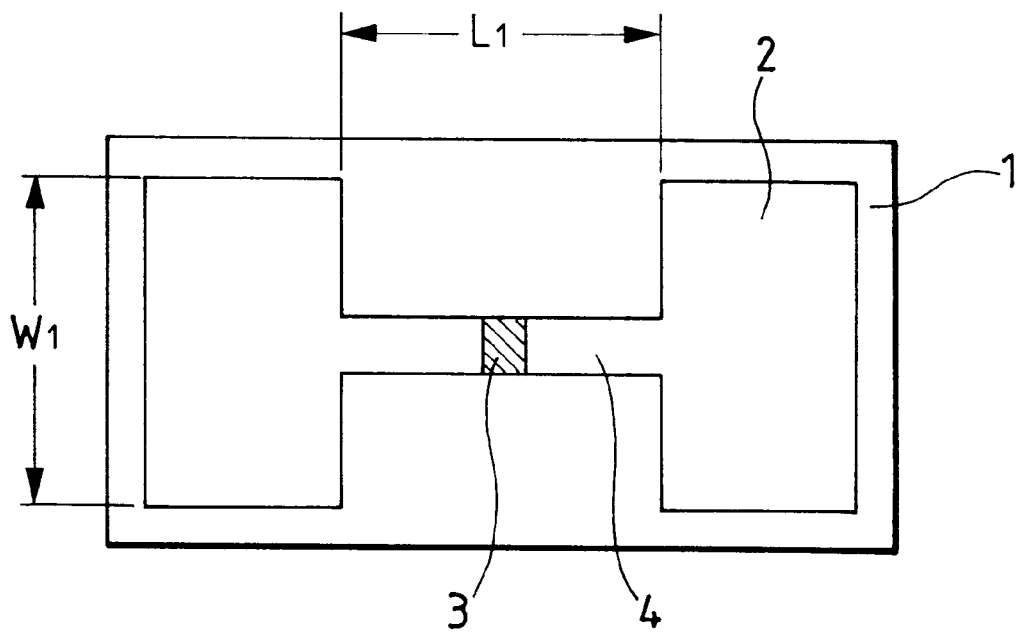
FIG. 20 is a schematic view of a conventional electron-emitting device.

FIG. 19 is a block diagram of a display apparatus realized by using a display panel prepared by using surface conduction electron-emitting devices of Example 36 as electron beam sources and arranged to provide visual information coming from a variety of sources of information including television transmission and other image sources.

In FIG. 19, there are shown a display panel 190, a display panel driver 171, a display panel controller 172, a multiplexer 173, a decoder 174, an input/output interface 175, a CPU 176, an image generator 177, image input memory interfaces 178, 179 and 180, an image input interface 181, TV signal receivers 182 and 183 and an input unit 184.

If the display apparatus is used for receiving television signals that are constituted by video and audio signals, circuits, speakers and other devices are required for receiving, separating, reproducing, processing and storing audio signals along with the circuits shown in the drawing. However, such circuits and devices are omitted here in view of the scope of the present invention.

Now, the components of the apparatus will be described, following the flow of image signals therethrough.

Firstly, the TV signal receiver 183 is a circuit for receiving TV image signals transmitted via a wireless transmission system using electromagnetic waves and/or spatial optical telecommunication networks. The TV signal system to be used is not limited to a particular one and any system such as NTSC, PAL or SECAM may feasibly be used with it. It is particularly suited for TV signals involving a larger number of scanning lines (typically of a high definition TV system such as the MUSE system) because it can be used for a large display panel 190 comprising a large number of pixels. The TV signals received by the TV signal receiver are forwarded to the decoder.

The TV signal receiver 183 is a circuit for receiving TV image signals transmitted via a wired transmission system using coaxial cables and/or optical fibers. Like the TV signal receiver 182, the TV signal system to be used is not limited to a particular one and the TV signals received by the circuit are forwarded to the decoder 174.

The image input interface 181 is a circuit for receiving image signals forwarded from an image input device such as a TV camera or an image pick-up scanner. It also forwards the received image signals to the decoder 174.

The image input memory interface 180 is a circuit for retrieving image signals stored in a video tape recorder (hereinafter referred to as VTR) and the retrieved image signals are also forwarded to the decoder 174.

The image input memory interface 179 is a circuit for retrieving image signals stored in a video disc and the retrieved image signals are also forwarded to the decoder 174.

The image input memory interface 178 is a circuit for retrieving image signals stored in a device for storing still image data such as so-called still disc and the retrieved image signals are also forwarded to the decoder 174.

The input/output interface 175 is a circuit for connecting the display apparatus and an external output signal source such as a computer, a computer network or a printer. It carries out input/output operations for image data and data on characters and graphics and, if appropriate, for control signals and numerical data between the CPU 176 of the display apparatus and an external output signal source.

The image generation circuit 177 is a circuit for generating image data to be displayed on the display screen on the basis of the image data and the data on characters and graphics input from an external output signal source via the input/output interface 175 or those coming from the CPU 176.

The circuit comprises reloadable memories for storing image data and data on characters and graphics, read-only memories for storing image patterns corresponding given character codes, a processor for processing image data and other circuit components necessary for the generation of screen images.

Image data generated by the image generation circuit 177 for display are sent to the decoder 174 and, if appropriate, they may also be sent to an external circuit such as a computer network or a printer via the input/output interface 175.

The CPU 176 controls the display apparatus and carries out the operation of generating, selecting and editing images to be displayed on the display screen. For example, the CPU 176 sends control signals to the multiplexer 173 and appropriately selects or combines signals for images to be displayed on the display screen. At the same time it generates control signals for the display panel controller 172 and controls the operation of the display apparatus in terms of image display frequency, scanning method (e.g., interlaced scanning or non-interlaced scanning), the number of scanning lines per frame and so on.

The CPU 176 also sends out image data and data on characters and graphic directly to the image generation circuit 177 and accesses external computers and memories via the input/output interface 175 to obtain external image data and data on characters and graphics. The CPU 176 may additionally be so designed as to participate other operations of the display apparatus including the operation of generating and processing data like the CPU of a personal computer or a word processor. The CPU 176 may also be connected to an external computer network via the input/output interface 175 to carry out computations and other operations, cooperating therewith.

The input unit 184 is used for forwarding the instructions, programs and data given to it by the operator to the CPU 176. As a matter of fact, it may be selected from a variety of input devices such as keyboards, mice, joysticks, bar code readers and voice recognition devices as well as any combinations thereof.

The decoder 174 is a circuit for converting various image signals input via said circuits 177 through 183 back into signals for three primary colors, luminance signals and I and Q signals. Preferably, the decoder 174 comprises image memories as indicated by a dotted line in FIG. 19 for dealing with television signals such as those of the MUSE system that require image memories for signal conversion.

The provision of image memories additionally facilitates the display of still images as well as such operations as thinning out, interpolating, enlarging, reducing, synthesizing and editing frames to be optionally carried out by the decoder 174 in cooperation with the image generation circuit 177 and the CPU 176.

The multiplexer 173 is used to appropriately select images to be displayed on the display screen according to control signals given by the CPU 176. In other words, the multiplexer 173 selects certain converted image signals coming from the decoder 174 and sends them to the drive circuit 171. It can also divide the display screen in a plurality of frames to display different images simultaneously by switching from a set of image signals to a different set of image signals within the time period for displaying a single frame.

The display panel controller 172 is a circuit for controlling the operation of the drive circuit 171 according to control signals transmitted from the CPU 176. Among others, it operates to transmit signals to the drive circuit 171 for controlling the sequence of operations of the power source (not shown) for driving the display panel in order to define the basic operation of the display panel 190. It also transmits signals to the drive circuit 171 for controlling the image display frequency and the scanning method (e.g., interlaced scanning or non-interlaced scanning) in order to define the mode of driving the display panel 190. If appropriate, it also transmits signals to the drive circuit 171 for controlling the quality of the images to be displayed on the display screen in terms of luminance, contrast, color tone and sharpness.

The drive circuit 171 is a circuit for generating drive signals to be applied to the display panel 190. It operates according to image signals coming from said multiplexer 173 and control signals coming from the display panel controller 172.

A display apparatus according to the invention and having a configuration as described above and illustrated in FIG. 19 can display on the display panel 190 various images given from a variety of image data sources. More specifically, image signals such as television image signals are converted back by the decoder 174 and then selected by the multiplexer 173 before sent to the drive circuit 171.

On the other hand, the display controller 172 generates control signals for controlling the operation of the drive circuit 171 according to the image signals for the images to be displayed on the display panel 190. The drive circuit 171 then applies drive signals to the display panel 190 according to the image signals and the control signals. Thus, images are displayed on the display panel 190. All the above described operations are controlled by the CPU 176 in a coordinated manner.

The above described display apparatus can not only select and display particular images out of a number of images given to it but also carry out various image processing operations including those for enlarging, reducing, rotating, emphasizing edges of, thinning out, interpolating, changing colors of and modifying the aspect ratio of images and editing operations including those for synthesizing, erasing, connecting, replacing and inserting images as the image memories incorporated in the decoder 174, the image generation circuit 177 and the CPU 176 participate such operations. Although not described with respect to the above embodiment, it is possible to provide it with additional circuits exclusively dedicated to audio signal processing and editing operations.

Thus, a display apparatus according to the invention and having a configuration as described above can have a wide variety of industrial and commercial applications because it can operate as a display apparatus for television broadcasting, as a terminal apparatus for video teleconferencing, as an editing apparatus for still and movie pictures, as a terminal apparatus for a computer system, as an OA apparatus such as a word processor, as a game machine and in many other ways.

It may be needless to say that FIG. 19 shows only an example of possible configuration of a display apparatus comprising a display panel provided with an electron source prepared by arranging a number of surface conduction electron-emitting devices and the present invention is not limited thereto. For example, some of the circuit components of FIG. 19 that are not necessary for a particular application may be omitted.

To the contrary, additional components may be arranged there depending on the application. For example, if a display apparatus according to the invention is used for visual telephone, it may be appropriately made to comprise additional components such as a television camera, a microphone, lighting equipment and transmission/reception circuits including a modem.

Since an image-forming apparatus according to the invention can be made very flat because the electron source itself comprising surface conduction electron-emitting devices does not require a large depth. In addition, the display panel can be made very large and have an enhanced brightness and a wide viewing angle to make it possible to display lively vivid images.

As described above in detail, the present invention provides a material for forming an electroconductive thin film having an even film thickness and excellent electric properties including electroconductivity as well as a method of manufacturing the same. Thus, there can be provided an electron source comprising surface conduction electron-emitting devices prepared by using such an electroconductive thin film for forming an electron-emitting region and capable of operating uniformly for electron emission and an image-forming apparatus incorporating such an electron source.

Secondly, a material for forming an electroconductive thin film can be used as a material for forming a liquid crystal alignment film showing a uniform film thickness and desired electric properties including electroconductivity even the film thickness is very small. A liquid crystal device using an electroconductive thin film according to the invention is free from uneven display performance, remarkable hysteresis and other display problems to provide a high quality display apparatus using liquid crystal.

What is claimed is:

1. A solution for forming an electroconductive film, wherein said solution comprises an effective conductive amount of an organometallic complex having the formula:

$$(R^1COO)_nM(NR^2R^3R^4)_m$$

where $R^1$ represents an alkyl group having 1 to 4 carbon atoms, each of $R^2$, $R^3$ and $R^4$ represents a hydrogen atom, an alkyl group having 1 to 30 carbon atoms or an alkenyl group having 2 to 30 carbon atoms, such that the total number of carbon atoms contained in $R^2$, $R^3$ and $R^4$ is seven or more, M represents a metal element and each of n and m represents an integer equal to or greater than 1.

2. The solution for forming an electroconductive film according to claim 1, wherein said metal element is selected from the group consisting of Pd, Ru, Ag, Cu, Cr, Tb, Cd, Fe, Pb and Zn.

3. The solution for forming an electroconductive film according to claim 1, wherein at least one of $R^2$, $R^3$, and $R^4$ has equal to or greater than 18 carbon atoms and the total number of carbon atoms of $R^2$, $R^3$, and $R^4$ is equal to or greater than 18, and each of m and n represents an integer between 2 and 4.

4. A solution for forming an electroconductive film, wherein said solution comprises an effective conductive amount of a metal-containing compound and a compound having the formula:

$$R^5COOH$$

wherein $R^5$ represents an alkyl or alkenyl group having 18 to 30 carbon atoms.

5. The solution for forming an electroconductive film according to claim 4, wherein said metal-containing compound comprises an organometallic compound.

6. The solution for forming an electroconductive film according to claim 4, wherein said metal-containing compound contains a metal selected from the group consisting of Pd, Ru, Ag, Cu, Cr, Tb, Cd, Fe, Pb and Zn.

7. A solution for forming an electroconductive film, wherein said solution comprises an effective conductive amount of an organometallic compound and a polyamic acid ester.

8. The solution for forming an electroconductive film according to claim 7, wherein said polyamic acid ester comprises an alkoxycarbonyl group having 8 to 30 carbon atoms.

9. A solution for forming an electroconductive film, wherein said solution comprises an effective conductive amount of an organometallic compound and poly(butyric acid).

10. The material solution for forming an electroconductive film according to any one of claims 8 or 9, wherein said metal-containing compound contains a metal selected from the group consisting of Pd, Ru, Ag, Cu, Cr, Tb, Cd, Fe, Pb and Zn.

11. A method of forming an electroconductive film comprising a step of forming a film on a substrate, said film comprising an effective conductive amount of an organometallic complex having the fonnula:

$$(R^1COO)_nM(NR^2R^2R^3R^4)_m$$

where $R^1$ represents an alkyl group having 1 to 4 carbon atoms, each of $R^2$, $R^3$ and $R^4$ represents a hydrogen atom, an alkyl group having 1 to 30 carbon atoms or an alkenyl group having 2 to 30 carbon atoms, such that the total number of carbon atoms contained in $R^2$, $R^3$ and $R^4$ is seven or more, M represents a metal element and each of n and m represents an integer equal to or greater than 1, and a step of baking the film.

12. The method of forming an electroconductive film according to claim 11, further comprising a step of irradiating said film with ultraviolet light.

13. The method of forming an electroconductive film according to claim 12, wherein said ultraviolet light irradiation is conducted in the presence of $O_3$.

14. The method of forming an electroconductive film according to claim 11, wherein said film a monomolecular film or a multi-layered monomolecular film.

15. The method of forming an electroconductive film according to claim 14, wherein said monomolecular film or said multi-layered monomolecular film is formed by the LB method.

16. The method of forming an electroconductive film according to claim 14, further comprising a step of irradiating said monomolecular film or said multi-layered monomolecular film with ultraviolet light.

17. The method of forming an electroconductive film according to claim 16, wherein said ultraviolet light irradiation is conducted in the presence of $O_3$.

18. The method of forming an electroconductive film according to claim 11, wherein at least one of $R^2$, $R^3$ and $R^4$ has equal to or greater than 18 carbon atoms and the total number of carbon atoms of $R^2$, $R^3$ and $R^4$ is equal to or greater than 18, and each of m and n represents an integer between 2 and 4.

19. The method of forming an electroconductive film according to claim 11, wherein said metal element is selected from the group consisting of Pd, Ru, Ag, Cu, Cr, Tb, Cd, Fe, Pb and Zn.

20. A method of forming a liquid crystal alignment film comprising a step of forming a film on a substrate, said film comprising an effective conductive amount of an organometallic complex having the formula:

$$(R^1COO)_nM(NR^2R^3R^4)_m$$

where $R^1$ represents an alkyl group having 1 to 4 carbon atoms, each of $R^2$, $R^3$ and $R^4$ represents a hydrogen atom, an alkyl group having 1 to 30 carbon atoms or an alkenyl group having 2 to 30 carbon atoms, such that the total number of carbon atoms contained in $R^2$, $R^3$ and $R^4$ is seven or more, M represents a metal element and each of n and m represents an integer equal to or greater than 1, and a step of baking the film.

21. The method of forming a liquid crystal alignment film according to claim 20, further comprising a step of irradiating said film comprising said organometallic complex with ultraviolet light.

22. The method of forming a liquid crystal alignment film according to claim 21, wherein said ultraviolet light irradiation is conducted in the presence of $O_3$.

23. The method of forming a liquid crystal alignment film according to claim 20, wherein said film a monomolecular film or a multi-layered monomolecular film.

24. The method of forming a liquid crystal alignment film according to claim 23, wherein said monomolecular film or said multi-layered monomolecular film is formed by the LB method.

25. The method of forming a liquid crystal alignment film according to claim 20, wherein at least one of $R^2$, $R^3$, and $R^4$ has equal to or greater than 18 carbon atoms and the total number of carbon atoms of $R^2$, $R^3$, and $R^4$ is equal to or greater than 18, and each of m and n represents an integer between 2 and 4.

26. The method of forming a liquid crystal alignment film according to claim 20, wherein said metal element is selected from the group consisting of Pd, Ru, Ag, Cu, Cr, Tb, Cd, Fe, Pb and Zn.

27. A method of forming a liquid crystal alignment film according to claim 23, further comprising a step of irradiating said monomolecular film or said multilayered monomolecular film with ultraviolet light.

28. A method of forming a liquid crystal alignment film according to claim 27, wherein said ultraviolet light irradiation is conducted in the presence of $O_3$.

29. A method of forming an electroconductive film comprising a step of forming a film on a substrate, said film comprising an effective conductive mount of a metal-containing compound and a compound having the formula:

$$R^5COOH$$

wherein $R^5$ represents an alkyl or alkenyl group having 18 to 30 carbon atoms, and a step of baking the film.

30. The method for forming an electroconductive film according to claim 29, wherein said metal-containing compound comprises an organometallic compound.

31. The method for forming an electroconductive film according to claim 29, wherein said metal-containing compound contains a metal selected from the group consisting of Pd, Ru, Ag, Cu, Cr, Tb, Cd, Fe, Pb and Zn.

32. The method of forming an electroconductive film according to claim 29, further comprising a step of irradiating said film with ultraviolet light.

33. The method of forming an electroconductive film according to claim 32, wherein said ultraviolet light irradiation is conducted in the presence of $O_3$.

34. The method of forming an electroconductive film according to claim 29, wherein said film is a monomolecular film or a multi-layered monomolecular film.

35. The method of forming an electroconductive film according to claim 34, wherein said monomolecular film or said multi-layered monomolecular film is formed by the LB method.

36. The method of forming an electroconductive film according to claim 34, further comprising a step of irradiating said monomolecular film with ultraviolet light.

37. The method of forming an electroconductive film according to claim 36, wherein said ultraviolet light irradiation is conducted in the presence of $O_3$.

38. A method of forming a electroconductive film comprising a step of forming a film on a substrate, said film comprising an effective conductive amount of an organometallic compound and a polyamic acid ester, and a step of baking the film.

39. The method of forming an electroconductive film according to claim 38, wherein said polyamic acid ester comprises an alkoxycarbonyl group having 8 to 30 carbon atoms.

40. A method of forming a liquid crystal alignment film comprising a step of forming a film on a substrate, said film comprising an effective conductive amount of an organometallic compound and a polyamic acid ester, and a step of baking the film.

41. The method of forming a liquid crystal alignment film according to claim 40, wherein said polyamic acid ester comprises an alkoxycarbonyl group having 8 to 30 carbon atoms.

42. The method of forming a liquid crystal alignment film according to claim 40, further comprising a step of irradiating said monomolecular film with ultraviolet light.

43. The method of forming a liquid crystal alignment film according to claim 42, wherein said ultraviolet light irradiation is conducted in the presence of $O_3$.

44. A method of forming a electroconductive film comprising a step of forming a film on a substrate, said film comprising an effective conductive amount of an organometallic compound and poly(butyric) acid, and a step of baking the film.

45. A method of forming a liquid crystal alignment film comprising a step of forming a film on a substrate, said film comprising an effective conductive amount of an organometallic compound and poly(butyric) acid, and a step of baking the film.

46. The method of forming an electroconductive film according to any one of claims 38 or 44, wherein said organometallic compound contains a metal selected from the group consisting of Pd, Ru, Ag, Cu, Cr, Tb, Cd, Fe, Pb and Zn.

47. The method of forming an electroconductive film according to any one of claims 38 or 44, further comprising a step of irradiating said film with ultraviolet light.

48. The method of forming an electroconductive film according to claim 47, wherein said ultraviolet light irradiation is conducted in the presence of $O_3$.

49. The method of forming an electroconductive film according to any one of claims 38 or 44, wherein said film is a monomolecular film or a multi-layered monomolecular film.

50. The method of forming an electroconductive film according to claim 49, wherein said monomolecular film or said multi-layered monomolecular film is formed by the LB method.

51. The method of forming an electroconductive film according to claim 49, further comprising a step of irradiating said monomolecular film with ultraviolet light.

52. The method of forming an electroconductive film according to claim 51, wherein said ultraviolet light irradiation is conducted in the presence of $O_3$.

53. The method of forming a liquid crystal alignment film according to any one of claims 40 or 45, wherein said metal-containing compound contains a metal selected from the group consisting of Pd, Ru, Ag, Cu, Cr, Th, Cd, Fe, Pb and Zn.

54. The method of forming a liquid crystal alignment film according to any one of claims 40 or 45, further comprising a step of irradiating said film with ultraviolet light.

55. The method of forming a liquid crystal alignment film according to claim 54, wherein said ultraviolet light irradiation is conducted in the presence of $O_3$.

56. The method of forming a liquid crystal alignment film according any one of to claims 40 or 45, wherein said film is a monomolecular film or a multi-layered monomolecular film.

57. The method of forming a liquid crystal alignment film according to claim 54, wherein said monomolecular film or said multi-layered monomolecular film is formed by the LB method.

58. A method of manufacturing an electron-emitting device, said device comprising a pair of electrodes and an electroconductive film including an electron-emitting region, said film being arranged between and connected to said pair of electrodes, wherein said method comprises a step of forming an electroconductive film on a substrate by the method of forming an electroconductive film according to any one of claims 10, 12, 13, 16, 17, 14, 15, 18, 19, 29–38, 39, 46 and 47–52.

59. A method of manufacturing an electron source comprising a plurality of electron-emitting devices, each provided with an electroconductive film including an electron-emitting region, wherein at least one of said electron-emitting devices is manufactured by a method according to claim 58.

60. A method of manufacturing an image-forming apparatus comprising electron-emitting devices, each provided with an electroconductive film including an electron-emitting region, wherein at least one of said electron-emitting devices is manufactured by a method according to claim 58.

61. A method for forming a liquid crystal alignment film comprising a step of forming a film on a substrate, said film comprising an effective conductive amount of a metal-containing compound and a compound having the formula:

$$R^5COOH$$

wherein $R^5$ represents an alkyl or alkenyl group having 18 to 30 carbon atoms, and a step of baking the film.

62. The method for forming a liquid crystal alignment film according to claim 61, wherein said metal-containing compound comprises an organometallic compound.

63. The method for forming a liquid crystal alignment film according to claim 61, wherein said metal-containing compound contains a metal selected from the group consisting of Pd, Ru, Ag, Cu, Cr, Tb, Cd, Fe, Pb and Zn.

64. The method of forming a liquid crystal alignment film according to claim 61, further comprising a step of irradiating said film with ultraviolet light.

65. The method of forming a liquid crystal alignment form according to claim 64, wherein said ultraviolet light irradiation is conducted in the presence of $O_3$.

66. The method of forming a liquid crystal alignment film according to claim 62, wherein said film is a monomolecular film or a multi-layered monomolecular film.

67. The method of forming a liquid crystal alignment film according to claim 66, wherein said monomolecular film or said multi-layered monomolecular film is formed by the LB method.

68. The method of forming a liquid crystal alignment film according to claim 66, further comprising a step of irradiating said monomolecular film with ultraviolet light.

69. The method of forming a liquid crystal alignment film according to claim 68, wherein said ultraviolet light irradiation is conducted in the presence of $O_3$.

70. A method of manufacturing a liquid crystal display apparatus, said apparatus comprising a liquid crystal alignment film, wherein said method comprises a step of forming said liquid crystal alignment film on a substrate by the method of forming a liquid crystal alignment film according to any one of claim 19, 20, 21, 27, 28, 23, 24, 25, 26, 61, 69, 40, 41, 53, and 54–57, 42, 43.

* * * * *

UNITED STATES PATENT AND TRADEMARK OFFICE
CERTIFICATE OF CORRECTION

PATENT NO.  : 6,106,906
DATED       : August 22, 2000
INVENTOR(S) : Hiroshi Matsuda, et al It is certified that error appears in the above-identified patent and that said Letters Patent is hereby corrected as shown below:

<u>Title page, item [56], Reference Cited,</u>
OTHER PUBLICATIONS, after C.A. Spindt, et al., "Molydenum" should read -- Molybdenum --.

<u>Column 1,</u>
Line 58, "molybdenium" should read -- molybdenum --.

<u>Column 2,</u>
Line 48, "is" should read -- are --.

<u>Column 3,</u>
Line 8, "be" should be deleted;
Line 16, "to" (1$^{st}$ occurrence) should read -- for --;
Line 19, "organomettalic" should read -- organometallic --.

<u>Column 4,</u>
Line 36, "capable" should read -- capable of --; and "even it" should read -- even if it --;
Line 39, "electroconductive" should read -- electroconductive film --;
Line 47, "even the" should read -- even though --.

<u>Column 5,</u>
Line 66, "preferred" should read -- the preferred --.

<u>Column 9,</u>
Line 26, "aklyl" should read --alkyl --.

<u>Column 13,</u>
Line 24, "hundreds" should read -- hundreds of --;
Line 25, "hundreds" should read -- hundreds of --.

<u>Column 16,</u>
Line 13, "and" should read -- , --;
Line 40, "remarkably" should read -- remarkable --.

<u>Column 19,</u>
Line 41, "devices" should read -- device --.

<u>Column 20,</u>
Line 3, "denotes" should read -- denote --;
Line 37, "be" should be deleted.

UNITED STATES PATENT AND TRADEMARK OFFICE
CERTIFICATE OF CORRECTION

PATENT NO.    : 6,106,906
DATED         : August 22, 2000
INVENTOR(S)   : Hiroshi Matsuda, et al It is certified that error appears in the above-identified patent and that said Letters Patent is hereby corrected as shown below:

Column 21,
Line 12, "circuits" should read -- circuit --.

Column 23,
Line 55, "an" should read -- a --.

Column 25,
Line 38, in example 3, after methyloctadecylamine, "paliadium" should read -- palladium --;
Line 47, in example 6, after ruthenium acetate-didecylamine, "EA-DDA/CHCl$_3$" should read -- RA-DDA/CHCl$_3$ N.B.: The reaction was conducted in a dark room for SA-EDHA in order to avoid photolysis. --.

Column 26,
Line 61, in example 9, after stearylamine, "palldium" should read -- palladium --.

Column 29,
Line 31, "ware" should read -- were --.

Column 30,
Line 24, "this" should read -- these --.

Column 32,
Line 20, "mixted" should read -- mixed --.

Column 33,
Line 45, "$_7$S/cm." should read -- $^7$S/cm. --.

Column 37,
Line 34, "simbols." should read -- symbols --;
Line 37, "connecting" should read -- connecting --.

Line 43,
Line 51, "material" should be deleted;
Line 52, "claims 8 or 9," should read -- claims 7 or 9, --;
Line 59, "fonnula" should read -- formula --;
Line 61, "(R$^1$Coo)$_n$ M(NR$^2$R$^3$R$^4$)$_m$" should read -- (R$^1$COO)$_n$ M(NR$^2$R$^3$R$^4$)$_m$ --.

Column 44,
Line 11, "film a" should read -- film is a --;
Line 56, "film a" should read -- film is a --.

UNITED STATES PATENT AND TRADEMARK OFFICE
CERTIFICATE OF CORRECTION

PATENT NO. : 6,106,906
DATED : August 22, 2000
INVENTOR(S) : Hiroshi Matsuda, et al It is certified that error appears in the above-identified patent and that said Letters Patent is hereby corrected as shown below:

Column 45,
Line 13, "mount" should read -- amount --.

Column 46,
Line 46, "according any one of to" should read -- according to any one of --;
Line 60, "claims 10," should read -- claims 11, --.

Column 48,
Line 2, "form" should read -- film --;
Line 22, "Claim 19, 20, 21, 27, 28, 23, 24, 25, 26, 61, 69," should read -- claims 20, 21, 22, 27, 28, 23, 24, 25, 26, 61-69, --.

Signed and Sealed this

Thirtieth Day of October, 2001

Attest:

*Attesting Officer*

NICHOLAS P. GODICI
*Acting Director of the United States Patent and Trademark Office*